United States Patent
Sakauchi et al.

(10) Patent No.: US 7,920,576 B2
(45) Date of Patent: Apr. 5, 2011

(54) PACKET RING NETWORK SYSTEM, PACKET FORWARDING METHOD AND NODE

(75) Inventors: Masahiro Sakauchi, Tokyo (JP); Daisaku Ogasahara, Tokyo (JP)

(73) Assignee: NEC Corporation, Tokyo (JP)

( * ) Notice: Subject to any disclaimer, the term of this patent is extended or adjusted under 35 U.S.C. 154(b) by 682 days.

(21) Appl. No.: 11/916,088

(22) PCT Filed: May 31, 2006

(86) PCT No.: PCT/JP2006/310866
§ 371 (c)(1),
(2), (4) Date: Nov. 30, 2007

(87) PCT Pub. No.: WO2006/129701
PCT Pub. Date: Dec. 7, 2006

(65) Prior Publication Data
US 2010/0014527 A1    Jan. 21, 2010

(30) Foreign Application Priority Data
May 31, 2005  (JP) .................... 2005-158777

(51) Int. Cl.
*H04L 12/56* (2006.01)
(52) U.S. Cl. ....................... 370/400; 370/317
(58) Field of Classification Search .......... 370/258, 370/219, 224, 218, 404, 386, 252, 223, 216, 370/317, 397; 709/232, 239, 201, 223, 242
See application file for complete search history.

(56) References Cited

U.S. PATENT DOCUMENTS

| | | | | |
|---|---|---|---|---|
| 5,841,989 A * | 11/1998 | James et al. | ................. | 709/239 |
| 5,864,677 A * | 1/1999 | Van Loo | ................. | 709/232 |
| 5,864,680 A * | 1/1999 | Edblad et al. | ................. | 709/242 |
| 6,556,547 B1 * | 4/2003 | Srikanth et al. | ................. | 370/317 |
| 6,714,549 B1 * | 3/2004 | Phaltankar | ................. | 370/397 |
| 6,981,034 B2 * | 12/2005 | Ding et al. | ................. | 709/223 |
| 7,227,838 B1 * | 6/2007 | O'Riordan | ................. | 370/219 |
| 7,289,496 B2 * | 10/2007 | Donoghue et al. | ................. | 370/386 |
| 7,339,887 B2 * | 3/2008 | Griswold et al. | ................. | 370/216 |
| 7,486,614 B2 * | 2/2009 | Yu | ................. | 370/223 |
| 7,512,140 B2 * | 3/2009 | Mutoh et al. | ................. | 370/404 |

(Continued)

FOREIGN PATENT DOCUMENTS
JP         04100446         4/1992
(Continued)

OTHER PUBLICATIONS

PCT/JP2006/310866 International Search Report, mailed Aug. 29, 2006.

(Continued)

*Primary Examiner* — Thong H Vu

(57) ABSTRACT

Nodes 901 and 902 have the same address. Upon reception of a broadcast packet whose TTL value is not zero from a ringlet 910*a*, a forwarding circuit 51 of each of the nodes 901 and 902 copies and transits the packet, and an address table 60 of each node learns the address based on the copied broadcast packet. Upon reception of a unicast packet whose destination is an address common to the two nodes from the ringlet 910*a*, the forwarding circuit 51 of one node 901 copies and transits the packet, while the forwarding circuit 51 of the other node 902 strips the packet, and each address tables learns the address. A filter circuit of the node 902 prohibits the passage of the packet from the ringlet 910*a*.

25 Claims, 13 Drawing Sheets

U.S. PATENT DOCUMENTS

| | | | | |
|---|---|---|---|---|
| 2001/0033548 A1* | 10/2001 | Saleh et al. | | 370/218 |
| 2005/0041595 A1* | 2/2005 | Uzun et al. | | 370/252 |
| 2006/0109802 A1* | 5/2006 | Zelig et al. | | 370/258 |
| 2006/0224659 A1* | 10/2006 | Yu | | 709/201 |
| 2007/0217331 A1* | 9/2007 | Khanna et al. | | 370/224 |
| 2008/0130490 A1* | 6/2008 | Yu et al. | | 370/223 |

FOREIGN PATENT DOCUMENTS

| | | |
|---|---|---|
| JP | 05130116 | 5/1993 |
| JP | 11262275 | 9/1999 |
| JP | 2003018171 | 1/2003 |
| JP | 2003258822 | 9/2003 |
| JP | 2004242194 | 8/2004 |
| JP | 2005033243 | 2/2005 |
| JP | 2005130049 | 5/2005 |
| WO | 2004073262 A1 | 8/2004 |
| WO | 2005015851 A1 | 2/2005 |

OTHER PUBLICATIONS

IEEE Computer Society, IEEE Standard for Information technology-Telecommunications and information exchange between systems-Local and metropolitan area networks-Specific Requirements, Part 17: Resilient packet ring (RPR) access method and physical layer specification Sep. 24, 2004, pp. 211-223, Institute of Electronics Engineers, Inc., NY, NY, USA.

IEEE Computer Society, IEEE Standard for Information technology-Telecommunications and information exchange between systems-Local and metropolitan area networks-Specific Requirements, Part 17: Resilient packet ring (RPR) access method and physical layer specification Sep. 24, 2004, pp. 27-54, Institute of Electronics Engineers, Inc., NY, NY, USA.

* cited by examiner

FIG.5

| | | NODE FIRST RECEIVING RPR PACKET FROM RINGLET | THE OTHER NODE |
|---|---|---|---|
| STATE 1 | UNICAST PACKET WHOSE DESTINATION ADDRESS IS NOT SAME AS ADDRESS OF ITS OWN NODE | NO TTL SUBTRACTION, TRANSIT, TRANSIT EVEN IF TTL = 0 | TTL SUBTRACTION, TRANSIT, DISCARD IF TTL = 0 BEFORE SUBTRACTION |
| STATE 2 | BROADCAST PACKET WHOSE TTL IS NOT ZERO | NO TTL SUBTRACTION, TRANSIT AND COPY | TTL SUBTRACTION, TRANSIT AND COPY |
| STATE 3 | BROADCAST CONTROL PACKET, AND TTL = 0 | TRANSIT | DISCARD |
| STATE 4 | UNICAST CONTROL PACKET, AND DESTINATION ADDRESS IS SAME AS ADDRESS OF ITS OWN NODE | TRANSIT AND COPY, TRANSIT (NOT COPY) IF TTL = 0 | STRIP, DISCARD IF TTL = 0 |
| STATE 5 | BROADCAST DATA PACKET, AND TTL = 0 | TRANSIT | DISCARD |
| STATE 6 | UNICAST DATA PACKET, AND DESTINATION ADDRESS IS SAME AS ADDRESS OF ITS OWN NODE | TRANSIT AND COPY, TRANSIT (NOT COPY) IF TTL = 0 | STRIP, DISCARD IF TTL = 0 |

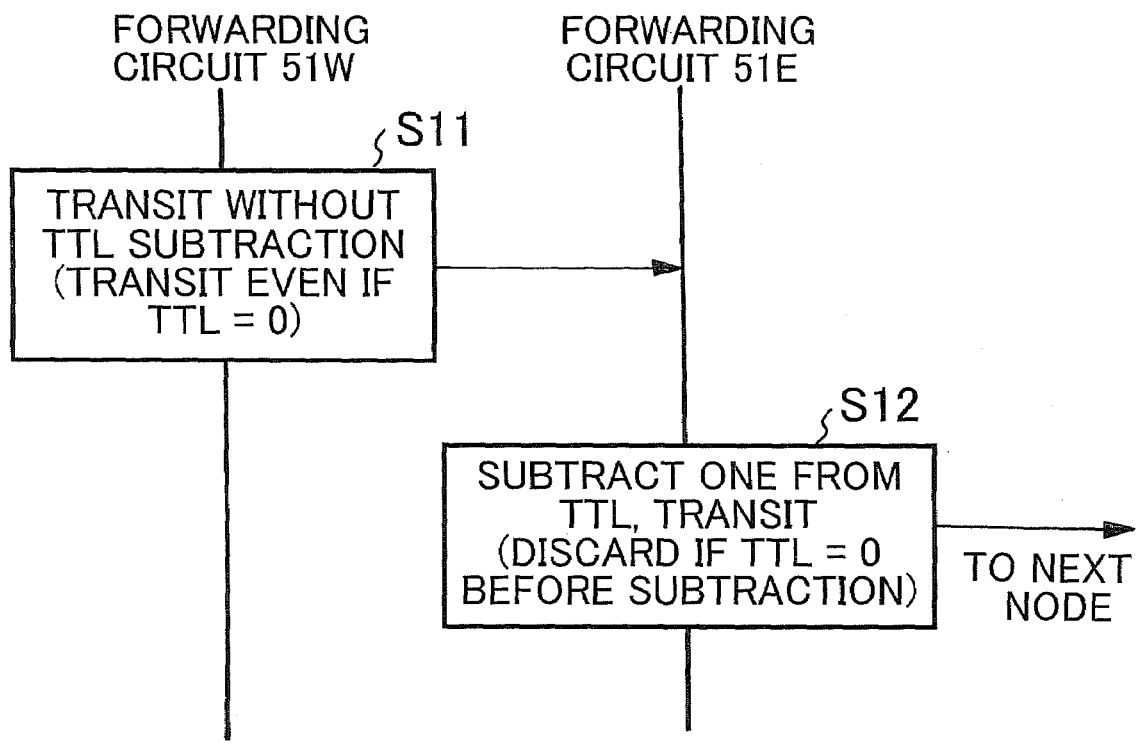
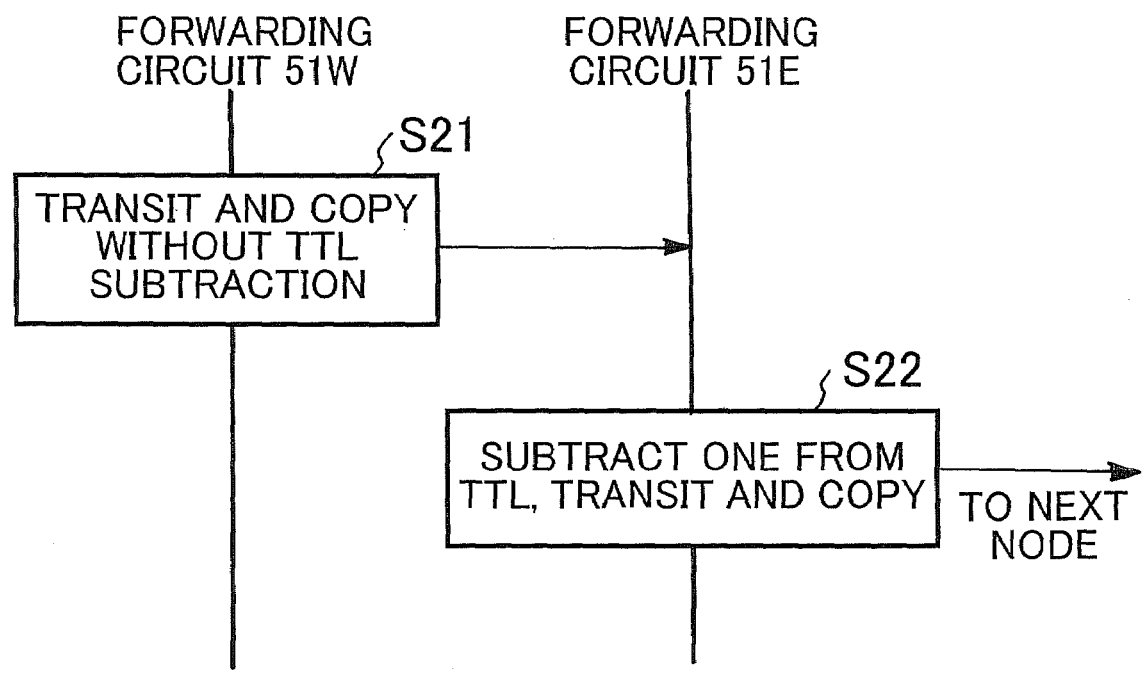

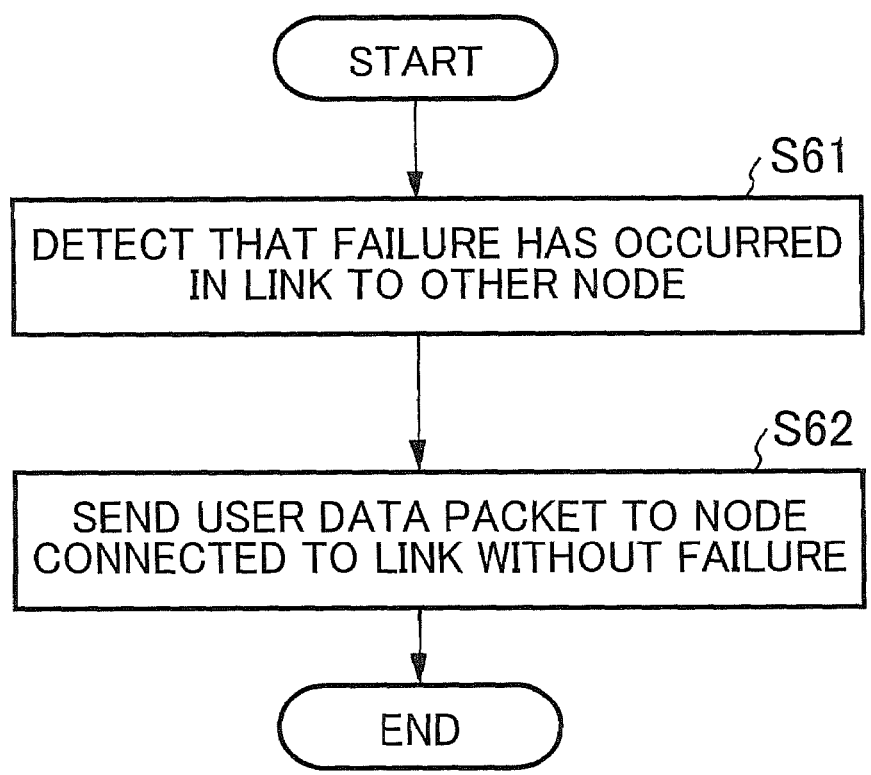
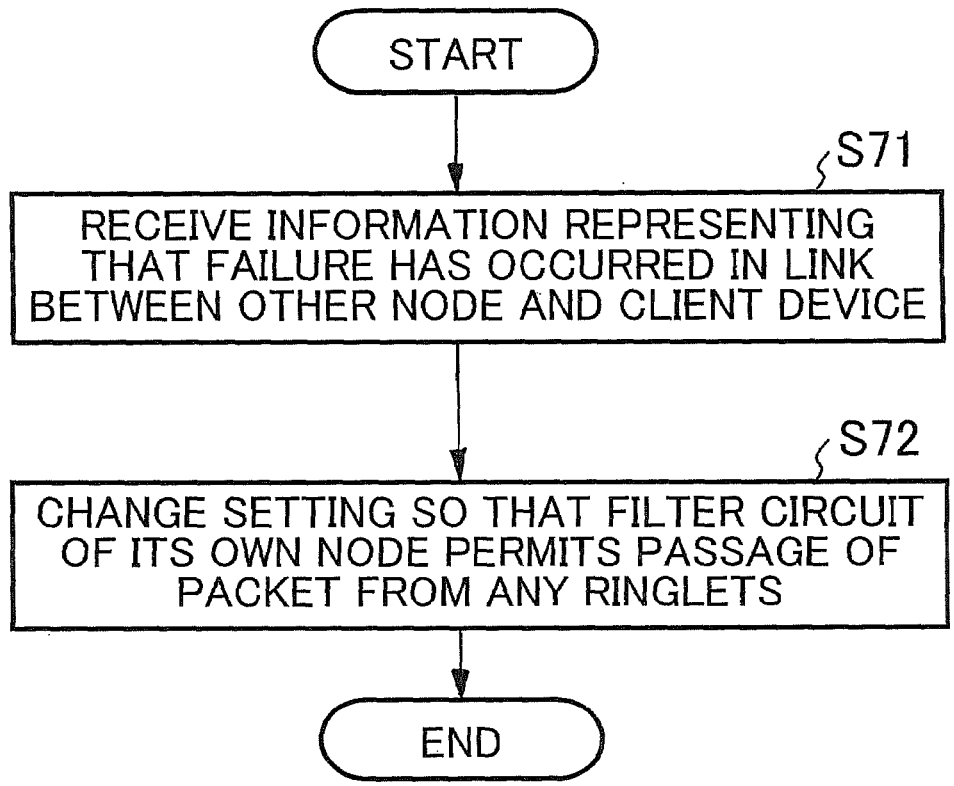

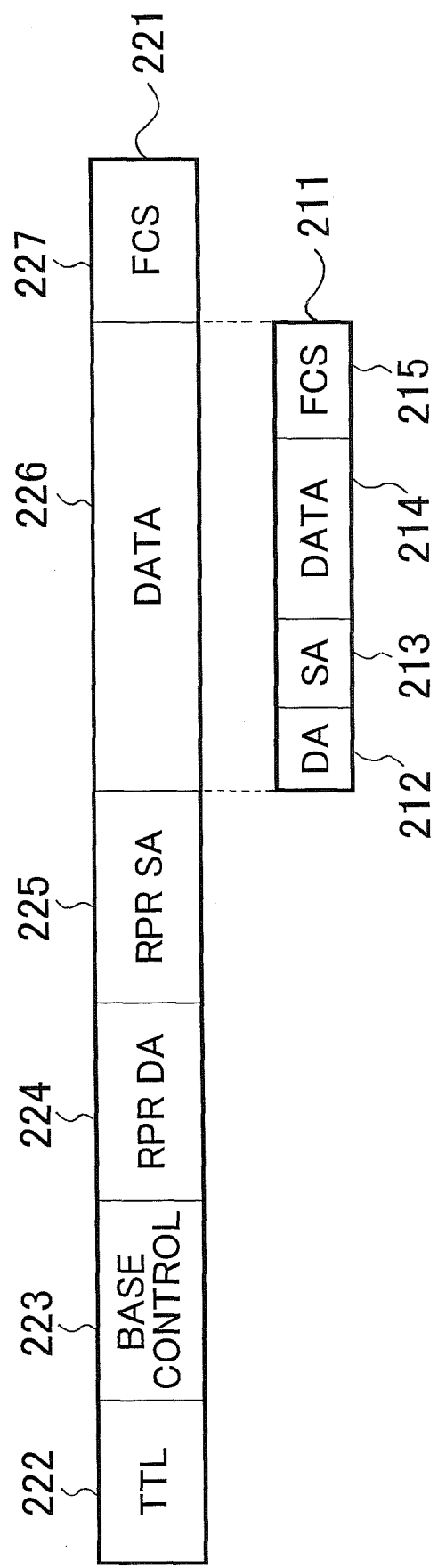

PACKET RING NETWORK SYSTEM, PACKET FORWARDING METHOD AND NODE

TECHNICAL FIELD

The present invention relates to a packet ring network system, a packet forwarding method, a node and a program for node, and particularly to a packet ring network system having a redundant node, a packet forwarding method which can be applied to such a packet ring network system, a node and a program for node.

BACKGROUND ART

An RPR (Resilient Packet Ring) is a packet ring network standardized by IEEE 802.17. The RPR is a MAC layer protocol for providing access to a transmission medium in a ring configuration. The RPR can realize failure recovery of carrier class at high speed, allow effective utilization of a network band, and provide data-forwarding through the shortest path.

FIG. 14 is an explanatory diagram showing an example of a network configuration of an RPR. As shown in FIG. 14, the packet ring included in the RPR network has two ringlets 1101 and 1102 for forwarding packet in opposite directions to each other. In the packet ring, a plurality of nodes connected in a ring configuration. In FIG. 14, four nodes 1103a, 1103b, 1103c and 1103d are connected to the packet ring. An RPR MAC address is given to each node of the packet ring. Once the network is built, control packets are transmitted between the nodes. Each of the nodes collects information regarding the number of hops between the nodes, and acquires topology information of the network.

Note that a node is a device which is provided in a communication network and implements communications through the communication network. Each of the nodes provided on the packet ring is a device which implements communications with another node or a client device (a user terminal) connected to itself.

A user terminal may be connected to each node of the packet ring. In the example of FIG. 14, a user terminal 1104a is connected to the node 1103a, while a user terminal 1104b is connected to the node 1103b.

In the following descriptions, a data packet of RPR packets to be forwarded in the RPR may be described as an RPR data packet. Similarly, a packet for control purposes of the RPR packets may be described as an RPR control packet or a control packet.

Descriptions will now be made to the RPR data packet standardized by IEEE 802.17. FIG. 15 is an explanatory diagram showing an RPR format. When a user terminal sends a packet to a node, the packet is a user data packet 211. The user data packet 211 includes a MAC address (MAC DA) 212 of the user terminal to be sent the user data packet, a MAC address (MAC SA) 213 of the user terminal sending the user data packet, transmission data 214 and an FCS (Frame Check Sequence) 215. Upon reception of the user data packet from the user terminal, the node encapsulates the user data packet so as to generate the RPR data packet 221, and sends and receives the RPR data packet 221 to and from the node. The user data packet 211 is encapsulated, and the RPR data packet 221 is stored as data 226. The RPR packet 221 includes a MAC address (RPR MAC SA) 225 of a destination node, a MAC address (RPR MAC DA) 224 of the source node, a Base Control field 223, a TTL (Time To Live) field 222 and an FCS 227. The Base Control field 223 includes information specifying a ringlet for packet forwarding and information identifying the kind of a packet, such as a control packet, etc. The TTL field 222 is used to prevent circling of the packet permanently along the ring. The format of the RPR data packet will specifically be described in non-patent document 1.

Descriptions will now be made to a transmission, reception and forwarding operations of the RPR data packet in each node of the ring.

First, descriptions will be made to the case of a unicast data packet (an RPR data packet to be unicast-transmitted). Upon reception of an RPR data packet to be forwarded through the ring, each node deletes this RPR data packet from the ring, if an RPR MAC DA of the RPR data packet is the same as an RPR MAC address of its own node. On the contrary, if the RPR MAC DA of the received RPR data packet differs from the RPR MAC address of its own node, the node decrements its TTL, and sends again the RPR data packet to the ringlet from which the packet has been received. Upon reception of a unicast data packet having sent by the node itself, the node deletes the unicast data packet from the ring. Each node deletes the RPR data packet from the ring, when its TTL value reaches "0" (zero).

For the case of a broadcast data packet (an RPR data packet to be broadcast-transmitted), each of the nodes forwards the received broadcast data packet to a next node, after decrementing the TTL value of the packet. Upon reception of the broadcast data packet sent by it self, the node sending the broadcast data packet deletes the broadcast data packet from the ring. Each of the nodes deletes the RPR packet from the ring, when the TTL value reaches "0".

Descriptions will now be made to an RPR control packet (control packet) standardized by IEEE 802.17. Of all nodes of the RPR network, each RPR node sends and receives a control packet through a data path so as to implement autonomous operations, such as a topology discovery function, a protection function, an OAM (Operation, Administration and Maintenance) function, etc. The IEEE 802.17 specification defines the individual control packet of each of the functions (e.g. those functions described above). The control packet is forwarded between the nodes similarly to the above-described forwarding of the RPR data packet.

Descriptions will now be made to an operation for sending data from the user terminal 1104a connected to the node 1103a to the user terminal 1104b connected to the node 1103b, in the RPR network shown in FIG. 14. Each of the nodes learns the an encapsulated MAC SA 213 (see FIG. 15) of the source user terminal and a source RPR MAC SA 225 (see FIG. 15) in the received RPR data packet, in association with each other, and keeps a database (i.e. an FDB (Forwarding Database)) of the RPR MAC address, which a search key is the MAC address of the user terminal. After the user terminal 1104a sends data (a user data packet) to the ring, the node 1103a receives this user data packet. The node 1103a searches the FDB based on the search key of the MAC DA 212 (see FIG. 15) in the received user data packet, and sets a searched result as an RPR MAC DA 224 (MAC address of the source node, see FIG. 15). The node 1103a sets its MAC address as an RPR MAC SA 225 (MAC address of the source node, see FIG. 15). Then, the node encapsulates the user data packet received from the user terminal 1104a. Further, the node 1103a searches the topology database, selects a ringlet for providing the shortest path from the source node to the destination node, sets a TTL value, and sends the RPR data packet to the ring.

As a result of searching the FDB, if the node has not learned the corresponding relationship between a MAC address of the target user terminal and the RPR MAC address corresponding to this MAC address, the node 1103a implements Flooding. A broadcast address is set for the RPR MAC DA of the RPR data packet to be sent in accordance with the flooding, and the RPR data packet is received by the all nodes of the ring. As a result of the flooding, the user data packet sent by the user terminal 1104a is received by the target user terminal 1104b. Then, the user terminal 1104b returns the packet to the user terminal 1104a. At the returning of the packet, the user terminal 1104b is a source of the user data packet, while the user terminal 1104a is the destination. In addition, the node 1103 is the source of the RPR packet. Upon returning of the packet from the user terminal 1104b, the node 1103a learns the corresponding relationship between the MAC address of the user terminal 1104b and the RPR MAC address of the node 1103b. Thus, if the user terminal 1104a sends a user data packet to the user terminal 1104b again, the node 1103a searches the RPR MAC address of the node 1103b based on the MAC DA 212 included in the user data packet, as a key. The node sets a result of this search as a RPR MAC DA 224 so as to implement unicast forwarding of the packet.

Descriptions will now be made to a protection operation for the RPR with reference to FIGS. 16A to 16C. The IEEE 802.17 specification defines a steering mode and a lap mode as a protection operation at the occurrence of a failure. The steering mode is defined as a required function, while the lap mode is defined as a selective function. These steering mode and the lap mode are introduced in patent document 1.

FIG. 16A shows a network operation in a normal state. FIG. 16A shows a state wherein a packet is forwarded from a node 303a to a node 303b on a ringlet 301.

FIG. 16B shows an operation in the steering mode. As shown in FIG. 16B, when a failure point 304 occurs, each of the all nodes in the ring acquires positional information of the failure point 304. That is, nodes 303c and 303d connected to the link with the failure point 304 inform all other nodes about the positional information of the failure point 304. As a result, each node knows the position of the failure point 304. When to send a unicast packet, the source node selects a ringlet without the failure point 304 in a link to the node to be sent the RPR packet, and sends a unicast packet thereto. For example, when the node 303a sends a unicast packet to the node 303b, the node identifies the position of the failure point 304. As a result, the node changes the target ringlet to which the unicast packet is sent, from the ringlet 301 to the ringlet 302, and forwards the packet to the node 303b. When to send a broadcast packet, the node selects both of the ringlets 301 and 302, and sends a broadcast packet to each of the ringlets 301 and 302. As a result, a broadcast packet is sent to each node of the ring.

FIG. 16C shows an operation in the lap mode. In the lap mode, the source node selects the same ringlet as that in the normal state, and sends a RPR packet. For example, when the node 303a sends an RPR packet to the node 303b, it selects the ringlet 301 like in the normal state (see FIG. 16A) so as to send the RPR packet thereto. Upon reception of the RPR packet, the node 303c which is connected to the link with the failure point 304 and has detected the failure selects the ringlet 302 which differs from the ringlet 301 from which the packet has been sent, and forwards the RPR packet using this ringlet 302. That is, the node 303c forwards the RPR packet to the side where there is no failure point 304. This packet is forwarded on the ringlet 302, and is forwarded to the node 303d, which is connected to the link with the failure point 304 and has detected the failure. The node 303d also selects a ringlet which differs from the ringlet from which the packet has been sent, and forwards the RPR packet using this ringlet. As a result, the destination node 303b receives the RPR packet. To flood a broadcast packet to the ring, the source node sends a packet to an arbitrary one of the ringlets in accordance with a predetermined method, or the source node sends a broadcast packet to both ringlets and forwards the packet to a predetermined destination point given in advance in the ring in order to prevent duplication of packet forwarding in accordance with a bidirectional flooding method. Note that a cleave point represents the packet's destination point which has been set in advance in the ring in order to prevent the duplication of packet forwarding. In the case of the bidirectional flooding, the TTL is so calculated that the packet is forwarded to the all nodes while avoiding duplication of packet arrival, depending on as to whether the number of nodes in the ring is an odd number or an even number.

The descriptions have been made to the example wherein the link failure has occurred. The protection operation when a failure has occurred in the node is the same as that when a failure has occurred in the link.

The protection operation defined by the above-described IEEE 802.17 specification provide failure recovery at high speed in a span (or link) failure in the ring network and failure recovery at high speed in the communications between the nodes other than the node with the failure. However, the above specification does not define an operation for failure recovery when a failure has occurred in the connection of the client device under each RPR node (i.e. the link between the node and the client device). In the configuration shown in FIG. 14, if a failure has occurred in the link between the node and the client device, communication cannot be implemented between the node and the client device (user terminal).

Patent document 2 discloses a technique for recovering a failure in a ring LAN. According to the technique for recovering a failure in a ring LAN of Patent document 2, control nodes are duplicated. One of the duplicated control nodes is set as an active node (working node), while the other node is an spare node (backup node). The active control node has the same address as that of the spare control node.

Patent document 1: JP-A 2004-242194 (paragraphs 0004 and 0012)

Patent document 2: JP-A 4-100446 (pp. 4-5, FIG. 1)

Non-Patent document 1: "IEEE Std 802. 17-2004 PART 17: Resilient packet ring (RPR) access method & physical layer specifications", IEEE (Institute of Electrical and Electronics Engineers, Inc), p. 211-223, "9. Frame formats", Sep. 24, 2004

DISCLOSURE OF THE INVENTION

Problems to be Solved by the Invention

As described above, in the network configuration shown in FIG. 14, if a failure has occurred in the link between the node and the client device (user terminal), communications can not be implemented between the node and the client device. It can therefore be considered that the technique disclosed in Patent document 2 is applied to the RPR. That is, the nodes are duplicated. One of the nodes is an active node, while the other node is a spare node. Both of the active node and the spare node may be connected to the same client device through respective links. In this case, the following problem may occur.

In the normal state, communications are implemented between the client device and the active node. However, no communications are implemented between the client device and the spare node. A problem is that the traffic processing capability of the spare node can not be used in the normal state, resulting in low resource utilization efficiency.

While communications are implemented between the client device and the active node in the normal state, the active node learns the corresponding relationship between a MAC SA which is encapsulated and a source RPR MAC SA of the source user terminal in the received RPR data packet, and stores the learned information in the FDB. At this time, if the spare node has not learned the same information, a failure will occur in the link between the active node and the client device. As a result, a problem is that it is difficult to rapidly recover stable packet traffic, when the active node is switched to the spare node. If the spare node has not learned the same information as the information learned by the active node, the spare node can not search the RPR MAC DA, and needs to broadcast-transmit the RPR packet which has been resulted from encapsulating the user data packet from the client terminal. This broadcast transmission is done until the spare node sufficiently learns the corresponding relationship between the MAC address of the client device and the RPR MAC address of the node. If the broadcast transmission is thus implemented, the amount of communications increases, thus putting pressure on the ring capacity of the ring network. As a result, if the active node is switched to the spare node, it is difficult to rapidly recover the stable packet traffic.

The protection operation for the RPR includes the above-described steering mode and the lap mode. However, these protection operations is to be implemented when a failure has occurred in the link for connecting the nodes in the ring network or in the node itself of the ring network, instead of being implemented when a failure has occurred between the node and the client device (user terminal).

The steering mode and the lap mode are operations for providing failure recovery, and have an effect on the entire packet ring network. For example, in the steering mode, a control packet needs to be given so as to inform the all nodes of the packet ring network that a ringlet for sending an RPR packet to the destination without passing through the failure point should be selected. Then, each of the nodes needs to use the CPU resources in order to implement a process for updating topology information, etc. In the steering mode, there may exist a node restricting only one available ringlet for sending the packet, thus remarkably lowering the effective utilization of band in the packet ring. If the mode shifts to the lap mode, a problem is that the ring band is reduced, or the all packets of a packet arrival order strict mode (Strict mode) in the ring in the lap mode are discarded. In this manner, in the steering mode or the lap mode, the communication quality is decreased due to a disturbance, such as loss of packet or a variation in packet flow. It is preferred that failure recovery be realized without having an effect on the entire packet ring network, when a failure has occurred in the link between the node and the client device (user terminal).

Not all ring network users may require highly reliable communications. If not, a user's request is satisfied by the network configuration of FIG. 14, where the node is not duplicated. It is preferred that the nodes have the common configuration between the cases where one client device (user terminal) is connected to one node (see FIG. 14) and where the two duplicated nodes are connected to one client device. For example, at the introduction of ring network, not a high level of reliability was not required. After the traffic increases, a high level of reliability is required, thus changing the network configuration so as to have duplicated nodes. At this time, if the nodes can not have the common configuration between the cases where one client device is connected to one node and where the two duplicated nodes are connected to one client device, the cost for changing the network configuration increase. It is necessary to individually design and prepare the node(s) in the case where one client device is connected to one node, and the node(s) in the case where the two duplicated nodes are connected to one client device. This lowers the efficiency in the node development and the efficiency in the inventory control. Therefore, it is preferred that the nodes have a common configuration.

It is an object of the present invention to realize failure recovery rapidly when a failure has occurred in a link between a node and a client device (user terminal). An object is to improve resource utilization efficiency in a normal state. An object is to realize failure recovery without having an effect on the entire packet ring network, when a failure has occurred in a link between a node and a client device (user terminal). An object is to have a common node configuration between a case where one client device is connected to one node and a case where one client device is connected to two duplicated nodes.

Means for Solving the Problems

According to the present invention, there is provided a packet ring network system which includes a plurality of nodes connected to each other through two ringlets for forwarding packets in opposite directions to each other, the system comprising:
a virtual redundant node which includes a combination of two nodes having a same address; and
a client device which is connected to the two nodes of the virtual redundant node, respectively through links,
wherein the client device distributes packets transmit to the two nodes.

In the packet ring network system of the present invention, the each of nodes included in the virtual redundant node includes two receivers respectively corresponding to the two ringlets and each of which receives a packet from a corresponding ringlet, and an address storage unit which stores a corresponding relationship between an address of the client device and an address of the node connected to the client device; a sender (sending portion) for client device, which sends a packet to the client device; and a filter unit which permits or prohibits output of the packet received by the each of the receivers (receiving portions) to the sender for client device.

In the packet ring network system of the present invention, of the receivers which receive a packet from a ringlet, in the two nodes included in the virtual redundant node, a receiver which first receives the packet may send a broadcast control packet to a next node without subtraction of TTL value, and generates the same packet as the received broadcast control packet, upon reception of the broadcast control packet whose the TTL value is not zero, and send a unicast control packet to a next node, and generates the same packet as the received unicast control packet, upon reception of the unicast control packet whose destination is an address of its own node; and a receiver which afterward receives the packet may send a broadcast control packet to a next node after subtracting one from TTL value, and generates the same packet as the received broadcast control packet, upon reception of the broadcast control packet whose the TTL value is not zero, and take a unicast control packet from the ringlet, upon reception of the unicast control packet whose destination is an address of its own node.

In the packet ring network system of the present invention, of the receivers which receive a packet from a ringlet, in the two nodes included in the virtual redundant node, a receiver which first receives a packet may send a broadcast data packet to a next node without subtraction of TTL value, and generates the same packet as the received broadcast data packet, upon reception of the broadcast data packet whose the TTL value is not zero, and send a unicast data packet to a next node, and generates the same packet as the received unicast data packet, upon reception of the unicast data packet whose destination is an address of its own node; and a receiver which afterward receives a packet may send a broadcast data packet to a next node after subtracting one from TTL value, and generates the same packet as the received broadcast data packet, upon reception of the broadcast data packet whose the TTL value is not zero, and take a unicast data packet from the ringlet, upon reception of the unicast data packet whose destination is an address of its own node.

In the packet ring network system of the present invention, the storage unit included in each node of the virtual redundant node may learn and store the corresponding relationship between an address of the client device and an address of the node connected to the each client device, based on the packet generated as the same packet as the broadcast data packet or unicast data packet received by the receiver of the same node, or based on the unicast data packet taken from the ringlet.

In the packet ring network system of the present invention, the filter unit in one node which first receives a packet from one ringlet, of the two nodes included in the virtual redundant node, may permit output of a packet forwarded from the one ringlet to the sender for client device, and prohibit output of a packet forwarded from other ringlet to the sender for client device; and the filter unit in other node which first receives a packet from other ringlet, of the two nodes included in the virtual redundant node,
may permit output of a packet forwarded from the other ringlet to the sender for client device, and prohibit output of a packet forwarded from the one ringlet to the sender for client device.

In the packet ring network system of the present invention, when a failure has occurred in one of the links connected to the respective two nodes included in the virtual redundant node, the client device may send a packet to the node connected thereto through the link without occurrence of the failure; and the filter unit of each node included in the virtual redundant node may permit output of a packet forwarded from any ringlets to the sender for client device, when a failure has occurred in a link between the client device and other node included in the virtual redundant node.

In the packet ring network system of the present invention, of the two nodes included in the virtual redundant node, one node which first receives a packet from one ringlet may include: a multiplexer which multiplexes packets so as to send them to other ringlet, and a packet generator which generates a packet to be forwarded to a ringlet based on a packet received from the client device; of the two nodes included in the virtual redundant node, one node which first receives a packet from the other ringlet may include: a multiplexer which multiplexes packets so as to send them to the one ringlet, and a packet generator which generates a packet to be forwarded to a ringlet based on a packet received from the client device;
of the two nodes included in the virtual redundant node, one node which first receives a packet from the one ringlet may include: a destination switch which outputs a packet to the multiplexer of the other node, when the packet generated based on the packet received from the client device is one to be sent to the one ringlet, and output a packet to the multiplexer of its own node, when the packet generated based on the packet received from the client device is one to be output to the other ringlet; of the two nodes included in the virtual redundant node, one node which first receives a packet from the other ringlet may include a destination switch which outputs a packet to the multiplexer of the other node, when the packet generated based on the packet received from the client device is one to be sent to the other ringlet, and which outputs a packet to the multiplexer of its own node, when the packet generated based on the packet received from the client device is one to be output to the one ringlet.

In the packet ring network system of the present invention, each of the nodes included in the virtual redundant node may include: a first multiplexer which multiplexes and sends packets to one ringlet; a second multiplexer which multiplexes and sends packets to other ringlet; a packet generator which generates a packet to be forwarded to a ringlet based on a packet received from the client device; and a destination switch which outputs a packet to the first multiplexer of its own node, when the packet generated based on a packet received from the client device is one to be sent to the one ringlet, and which outputs a packet to the second multiplexer of its own node, when the packet generated based on a packet received from the client device is one to be sent to the other ringlet.

In the packet ring network system of the present invention, each of the nodes included in the virtual redundant node may include: a packet forwarding device which sends a packet to a next node as is, upon reception of the packet whose source address is an address of its own node from the other node included in the virtual redundant node.

In the packet ring network system of the present invention, the packet forwarding device of each of the nodes included in the virtual redundant node may send a broadcast packet to a next node as is, upon reception of the broadcast packet generated by other node from the other node included in the virtual redundant node.

According to the present invention, there is provided a packet forwarding method to be applied to a packet ring network system which has a plurality of nodes connected to each other through two ringlets for forwarding packets in opposite directions to each other, and which includes a virtual redundant node including a combination of two nodes having a same address, wherein a client device connected to the two nodes included in the virtual redundant node through respective links distributes packets to the two nodes.

The packet forwarding method of the present invention may comprise the steps of: of the two nodes included in the virtual redundant node and receiving a packet from a same ringlet, in a node which first receives a packet, sending a broadcast control packet to a next node without subtraction of TTL value, and generating the same packet as the received broadcast control packet, upon reception of the broadcast control packet whose the TTL value is not zero; sending a unicast control packet to a next node, and generating the same packet as the received unicast control packet, upon reception of the unicast control packet whose destination is an address of its own node; and in a node which afterward receives a packet, sending a broadcast control packet to a next node after subtracting one from TTL value, and generating the same packet as the received broadcast control packet, upon reception of the broadcast control packet whose the TTL value is not zero, and taking a unicast control packet from the ringlet, upon reception of the unicast control packet whose destination is an address of its own node.

The packet forwarding method of the present invention may comprise the steps of: of the two nodes included in the virtual redundant node and receiving a packet from a ringlet, in a node which first receives a packet, sending a broadcast data packet to a next node without subtraction of TTL value, and generating the same packet as the received broadcast data packet, upon reception of the broadcast data packet whose the TTL value is not zero, sending a unicast data packet to a next node, and generating the same packet as the received unicast data packet, upon reception of the unicast data packet whose destination is an address of its own node; and in a node which afterward receives a packet, sending a broadcast data packet to a next node after subtracting one from TTL value, and generating the same packet as the received broadcast data packet, upon reception of the broadcast data packet whose the TTL value is not zero, and taking a unicast data packet from a ringlet, upon reception of the unicast data packet whose destination is an address of its own node.

The packet forwarding method of the present invention may comprise the step of: in each of the nodes included in the virtual redundant node, learning and storing the corresponding relationship between an address of the client device and an address of the node connected to the client device, based on the packet generated as the same packet as the received broadcast data packet or unicast data packet, or based on the unicast data packet taken from the ringlet.

The packet forwarding method of the present invention may comprise the step of: in the node included in the two nodes of the virtual redundant mode and first receiving a packet from the one ringlet, permitting output of a packet forwarded from the one ringlet to a sender for client device, which sends a packet to the client device, and prohibiting output of a packet forwarded from the other ringlet to the sender for client device; and in the node included in the two nodes of the virtual redundant node and first receiving a packet from the other ringlet, permitting output of a packet forwarded from the other ringlet to the sender for client device, and prohibiting output of a packet forwarded from the one ringlet to the sender for client device.

The packet forwarding method of the present invention may comprise the steps of: when a failure has occurred in one of links for connecting between the two nodes included in the virtual redundant node and the client device, sending a packet to the node connected to the link without occurrence of the failure, in the client device; and permitting output of a packet forwarded from any ringlets to the sender for client device, in the node without occurrence of the failure in the link to the client device.

The packet forwarding method of the present invention may comprise the steps of: in the node of the two nodes included in the virtual redundant node and first receiving a packet from the one ringlet, generating a packet to be forwarded to a ringlet based on a packet received from the client device; outputting the packet to the other node, and sending the packet to the other node, when the generated packet is one to be sent to the one ringlet; and sending the packet from its own node, when the generated packet is one to be sent to the other ringlet; and in the node of the two nodes included in the virtual redundant node and first receiving a packet from the other ringlet, generating a packet to be forwarded to a ringlet based on a packet received from the client device; outputting the packet to the other node, and sending the packet to the other node, when the generated packet is one to be sent to the other ringlet; and sending the packet from its own node, when the generated packet is one to be sent to the one ringlet.

The packet forwarding method of the present invention may further comprise the steps of: in each of the nodes included in the virtual redundant node, generating a packet to be forwarded to a ringlet based on a packet received from the client device; and sending the generated packet from its own node, regardless of whether the generated packet is one to be sent to the one ringlet or to be sent to the other ringlet.

The packet forwarding method of the present invention may further comprise the step of: in each of the nodes included in the virtual redundant node, sending a packet to a next node as is, upon reception of the packet whose source address is an address of its own node from the other node included in the virtual redundant node.

The packet forwarding method of the present invention may further comprising the step of: in each of the nodes included in the virtual redundant node, sending a broadcast packet to a next node as is, upon reception of the broadcast packet generated by other node from the other node included in the virtual redundant node.

According to the present invention, there is provided a node which is applied to a packet ring network system including a plurality of nodes connected to each other through two ringlets for forwarding packets in opposite directions to each other, and the node being used in a first usage state wherein the node is independently arranged by itself, in a second usage state wherein the node is combined with other node having the same address as an address of its own node and is so arranged as to receive a packet from one ringlet before the other node, or in a third usage state wherein the node is combined with other node having the same address as an address of its own node and is so arranged as to receive a packet from one ringlet after the other node, the node comprising: a first receiver which receives a packet from one ringlet; a second receiver which receives a packet from other ringlet; a sender for client device, which sends a packet to a client device; and a filter unit which permits or prohibits output of the packet received by the first receiver or the second receiver to the sender for client device, wherein: the first receiver implements a process corresponding to the received packet in accordance with a predetermined rule, in the first usage state, upon reception of the broadcast packet whose TTL value is not zero, sends a broadcast packet to a next node without subtraction of its TTL value and generates the same packet as the received broadcast packet, and upon reception of the unicast packet whose destination is an address of its own node, sends a unicast packet to a next node, and generates the same packet as the received unicast packet, in the second usage state, and upon reception of the broadcast packet whose TTL value is not zero, sends a broadcast packet to a next node after subtracting one from its TTL value and generates the same packet as the received broadcast packet, and, upon reception of the unicast data packet whose destination is an address of its own node, takes a unicast data packet from a ringlet, in the third usage state; the second receiver implements a process corresponding to the received packet in accordance with a predetermined rule, in the first usage state, upon reception of the broadcast packet whose TTL value is not zero, sends a broadcast packet to a next node after subtracting one from its TTL value and generates the same packet as the received broadcast packet, and, upon reception of the unicast data packet whose destination is an address of its own node, takes a unicast data packet from a ringlet, in the second usage state, and upon reception of the broadcast packet whose TTL value is not zero, sends a broadcast packet to a next node without subtraction of TTL value and generates the same packet as the received broadcast packet, and, upon reception of the unicast packet whose destination is an address of its own node, sends a unicast packet to a next node and generates the same packet as the received unicast packet, in the third usage state; and the filter unit permits output of the packet received by both of the first receiver and the second receiver to the sender for client device, in the first usage state, permits output of the packet received by the first receiver to the sender for client device, and prohibits output of the packet received by the second receiver to the sender for client device, in the second usage state, prohibits output of the packet received by the first receiver to the sender for client device, and permits output of the packet received by the second receiver to the sender for client device, in the third usage state.

The node of the present invention may further comprise: a packet generator which generates packets to be forwarded to a ringlet based on a packet received from the client device; a first multiplexer which multiplexes at least the packets generated by the packet generator so as to send them to one ringlet; a second multiplexer which multiplexes at least the packets generated by the packet generator so as to send them to other ringlet; and a destination switch which outputs the packet generated by the packet generator to the first multiplexer or second multiplexer of its own node or the other node, wherein the destination switch outputs the packet generated by the packet generator to the first multiplexer or second multiplexer of its own node, in accordance with a target ringlet to which the packet is sent, in the first usage state, outputs the packet generated by the packet generator to the first multiplexer included in the other node when the packet is one to be sent to the one ringlet, and outputs the packet generated by the packet generator to the second multiplexer included in its own node when the packet is one to be sent to the other ringlet, in the second usage state, outputs the packet generated by the packet generator to the first multiplexer included in its own node when the packet is one to be sent to the one ringlet, and outputs the packet generated by the packet generator to the second multiplexer included in the other node when the packet is one to be sent to the other ringlet, in the third usage state.

The node of the present invention may further comprise: a packet generator which generates packets to be forwarded to a ringlet based on a packet received from the client device; a first multiplexer which multiplexes at least the packets generated by the packet generator so as to send them to one ringlet; a second multiplexer which multiplexes at least the packets generated by the packet generator so as to send them to other ringlet; and a destination switch which outputs the packets generated by the packet generator to the first multiplexer or second multiplexer in its own node corresponding to a target ringlet to which the packet is sent, and wherein the first receiver sends, upon reception of a packet whose source address is an address of its own node from the other node, the packet to a next node as is, in the third usage state, and the second receiver sends a packet to a next node as is, upon reception of the packet whose source address is an address of its own node from the other node, the packet to a next node as is, in the second usage state.

According to the present invention, there is provided a program for node for executing a computer included in a node which is applied to a packet ring network system having a plurality of nodes connected through two ringlets for forwarding packets in opposite directions to each other, the node being used in a first usage state wherein the node is independently arranged by itself, a second usage state wherein the node is combined with other node having the same address as an address of its own node and is so arranged as to receive a packet from one ringlet before the other node, or a third usage state wherein the node is combined with other node having the same address as an address of its own node and is so arranged as to receive a packet from one ringlet after the other node, and the program making the computer executing: a first receiving process of: receiving a packet from one ringlet, executing a process corresponding to the received packet in accordance with a predetermined rule in the first usage state, sending a broadcast packet to a next node without subtraction of TTL value and generating the same packet as the received broadcast packet, upon reception of the broadcast packet whose the TTL value is not zero, and sending a unicast packet to a next node and generating the same packet as the received unicast packet upon reception of the unicast packet whose destination is an address of its own node, in the second usage state, and subtracting one from TTL value of a broadcast packet, sending the broadcast packet to a next node and generating the same packet as the received broadcast packet, upon reception of the broadcast packet whose the TTL value is not zero, and taking a unicast data packet from a ringlet, upon reception of the unicast data packet whose destination is an address of its own node, in the third usage state; a second receiving process of: receiving a packet from the other ringlet, executing a process corresponding to the received packet in accordance with a predetermined rule in the first usage state, sending a broadcast packet to a next node after subtracting one from TTL value and generating the same packet as the received broadcast packet, upon reception of the broadcast packet whose the TTL value is not zero, and taking a unicast data packet from a ringlet, upon reception of the unicast data packet whose destination is an address of its own node, in the second usage state, and sending a broadcast packet to a next node without subtraction of TTL value and generating the same packet as the received broadcast packet, upon reception of the broadcast packet whose the TTL value is not zero, and sending a unicast packet to a next node and generating the same packet as the received unicast packet, upon reception of the unicast packet whose destination is an address of its own node, in the third usage state; a filtering process of: passing the packet received by both in the first receiving process and the second receiving process in the first usage state, discarding the packet received by the second receiver without discarding the packet received in the first receiving process in the second usage state, discarding the packet received in the first receiving process without discarding the packet received in the second receiving process in the third usage state; and a sending process for client device of sending the packet which has been passed in the filtering process to a client device.

According to the present invention, the client device distributes the packets to the two nodes included in the virtual redundant node. Thus, each of the two nodes included in the virtual redundant node contributes to the forwarding of the packet from the client device. There is no such a state wherein one of the two nodes simply has to wait, thus improving resource (the two nodes included in the virtual redundant node) utilization efficiency.

The storage unit included in each node of the virtual redundant node can learn and store the corresponding relationship between the address of each client device and the address of the node connected to the client device, based on the packet generated as the same packet as the broadcast data packet or unicast data packet received by the receiver (receiving portion) of the same node, or the unicast data packet taken from the ringlet. Thus, each node included in the virtual redundant node learns and stores the corresponding relationship between the addresses. Even when a failure has occurred in a link between one node and the client device, the other node stores the address corresponding relationship, and does not need to learn the new corresponding relationship. As a result, the failure in the link between the one node and the client device can rapidly be recovered.

When a failure has occurred in one of the links between the two nodes of the virtual redundant node and the client device, the client device sends a packet to the node connected to the link without the failure. When a failure has occurred in the other one of the links between the nodes of the virtual redundant node and the client device, the filter unit of each node included in the virtual redundant node permits output of packet forwarded from any ringlets to the sender (sending portion) for client device. Even if a failure has occurred in the link between the one node and the client device, the packet is sent from the client device to the node connected to thereto through the link without the failure. When a failure has occurred in the link between the other node of the virtual redundant node and the client device, the filter unit of each node included in the virtual redundant node permits the packet forwarded from any ringlets to be output to the sender for client device. Thus, at the time when no link failure has occurred, the node connected to the link without the failure sends the packet to the client. This is used to be done by the other node. In addition, the node without the link failure is responsible for sending the packets to the client device. As a result, the packets can be sent from the client device to the virtual redundant node and from the virtual redundant node to the client device, without having an effect on the entire packet ring network.

The node of the present invention includes a first receiver which receives a packet from one ringlet, a second receiver which receives a packet from other ringlet, a sender for client device, which sends a packet to a client device, and a filter unit which permits or prohibits output of the packet received by the first receiver or the second receiver to the sender for client device, wherein the first receiver, the second receiver and the filter unit implement operations in accordance with a first usage state wherein the node is independently arranged by itself, a second usage state wherein the node is combined with the other node having the same address as the address of its own node and is so arranged as to receive a packet from one ringlet before the other node, or a third usage state wherein the node is combined with other node having the same address as an address of its own node and is so arranged as to receive a packet from one ringlet after the other node. The node of the present invention can be used, when one client device is connected to one node, or even when one client device is connected to the two duplicated nodes. That is, the nodes can have a common configuration between when one client device is connected to one node and when one client device is connected to two duplicated nodes.

According to the present invention, the client device distributes packets to two nodes included in the virtual redundant node, thus improving resource utilization efficiency.

The node of the present invention includes a first receiver which receives a packet from one ringlet, a second receiver which receives a packet from other ringlet, a sender for client device, which sends a packet to a client device, and a filter unit which permits or prohibits output of the packet received by the first receiver or the second receiver to the sender for client device, wherein the first receiver, the second receiver and the filter unit implement operations in accordance with a first usage state wherein the node is independently arranged by itself, a second usage state wherein the node is combined with the other node having the same address as the address of its own node and is so arranged as to receive a packet from one ringlet before the other node, or a third usage state wherein the node is combined with other node having the same address as an address of its own node and is so arranged as to receive a packet from one ringlet after the other node. Thus, the nodes can have a common configuration between when one client device is connected to one node and when one client device is connected to two duplicated nodes.

BRIEF DESCRIPTION OF THE DRAWINGS

FIG. 5 is an explanatory diagram showing operations of a forwarding circuit of each node.

FIG. 6 is a flowchart showing operations of forwarding circuits 51W and 51E in state 1.

FIG. 7 is a flowchart showing operations of the forwarding circuits 51W and 51E in state 2.

FIG. 10 is a flowchart showing operations of a client device when a link failure has occurred.

FIG. 11 is a flowchart showing operations of one of the two nodes that is connected to the client device between which no link failure has occurred.

FIG. 15 is an explanatory diagram showing an RPR format.

EXPLANATION OF REFERENCE NUMERALS

Figure 1:
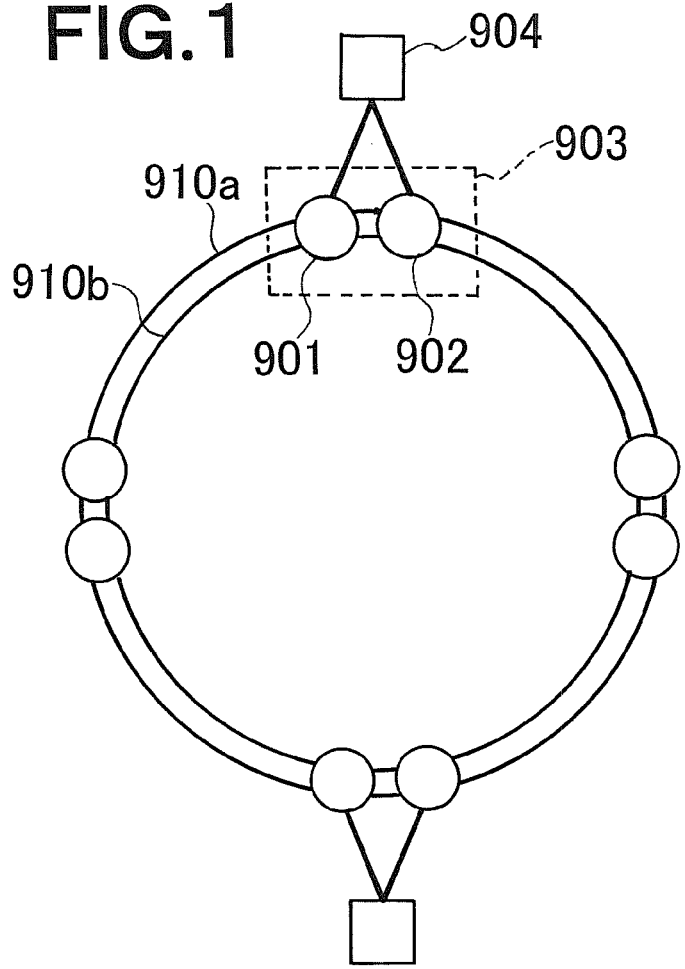
FIG. 1 is an explanatory diagram showing an example of a packet ring network system according to the present invention.

51, 52 forwarding circuit
53, 54, 55 multiplexing circuit
56 ringlet selecting circuit
57 topology management circuit
58, 59 Add changeover switch
60 address table
61 packet transformation circuit
62 filter circuit
63 control packet processing circuit
64 TTL setting circuit
100 redundant node system control circuit
903 virtual redundant node
904 client device

BEST MODE FOR CARRYING OUT THE INVENTION

Preferred embodiments of the present invention will now be explained with reference to the drawings.

First Embodiment

FIG. 1 is an explanatory diagram showing an example of a packet ring network system of the present invention. The packet ring network system of the present invention includes a ring (a packet ring wherein nodes are connected in a ring configuration). The packet ring network system has a combination of two RPR nodes (hereinafter referred to as nodes) 901 and 902 and redundantly includes the two nodes 901 and 902. A combination 903 of the two nodes acts as virtually as one node. As shown in FIG. 1, the packet ring network system has four combinations of the two nodes. However, the number of combinations of the two nodes is not limited to four. Hereinafter, the combination of the two nodes is noted as a virtual redundant node. The virtual redundant node includes two adjacent nodes. The virtual redundant nodes of the packet ring network system operate the same. If the client device is connected to the virtual redundant node, the device is connected thereto by links of its two nodes included in the virtual redundant node. For example, a client device (user terminal) 904 shown in FIG. 1 is connected to the nodes 901 and 902 included in the virtual redundant node 903. The nodes of the packet ring network system are connected with each other through ringlets 910a and 910b for forwarding packets in opposite directions to each other.

The ringlet 910a is provided for forwarding RPR packets in a clockwise direction, while the ringlet 910b is provided for forwarding RPR packets in a counter-clockwise direction. For easy explanation, of the two nodes of the virtual redundant node 903, a West Node represents one node that first receives the packet forwarded in a clockwise direction, while an East Node represents the other node that receives the packet forwarded from the West Node in a clockwise direction.

The two nodes included in the virtual redundant node 903 have the same RPR MAC address.

Figure 2:
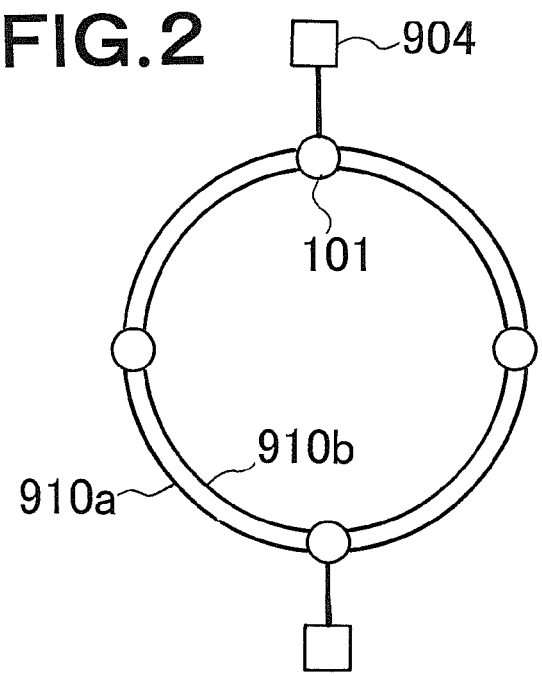
FIG. 2 is an explanatory diagram showing an example of a packet ring network system wherein a single client device is connected to a single node.

The packet ring network system may have a one-to-one correspondence between the client devices and the nodes which are connected with each other, without the redundancy of the nodes having the same configuration as that of the node included in the virtual redundant node 903. FIG. 2 shows an example of this packet ring network system. In the packet ring network system of FIG. 2, the client device is connected to one node. For example, the client device 904 shown in FIG. 2 is connected to a node 101. The nodes are connected with each other through the ringlets 910a and 910b for forwarding packets in opposite directions to each other.

The node 101 which is connected to the client device in a one-to-one correspondence to each other has the same configuration as that of the nodes 901 and 902 which are connected to one client device as two duplicated nodes. The configuration of such nodes will be described later. The nodes 101, 901 and 903 are identified by different reference numerals, but have the same configuration. Note, however, that the setting of each of the nodes may differ depending on the connection state with respect to the client device. The nodes operate differently depending on their setting, even though they have the same configuration. The node 101 (a node not included in the virtual redundant node) which is not redundantly arranged as shown in FIG. 2 is noted as being set in a redundancy incompatible mode. The nodes 901 and 902 included in the virtual redundant node shown in FIG. 1 are noted as being set in a redundancy compatible mode. When the nodes 901 and 902 of the virtual redundant node are set in a redundancy compatible mode, the nodes are set differently in accordance with whether or not each of them is a West Node or an East Node.

A superior provisioning setting technique may be used for setting each of the nodes in a redundancy incompatible mode, or for setting the West Node and the East Node in a redundancy compatible mode. That is, an information processor (not illustrated), such as a personal computer, etc. connected to a destination node to be set is provided in advance. The information processor (a personal computer in this embodiment) implements various setting for the node.

When the configuration of the ring network system is changed, the personal computer changes the setting of the node in accordance with the change. For example, if a new node is provided beside the node 101 shown in FIG. 2 so as to form a virtual redundant node, the personal computer changes the setting of the node 101 and newly provided node (not illustrated) into a redundancy compatible mode, in accordance with operator operations. If either one of the nodes 901 and 902 shown in FIG. 1 is discarded, the personal computer changes the setting of the remaining node into a redundancy incompatible mode, in accordance with operator operations.

Figure 3:
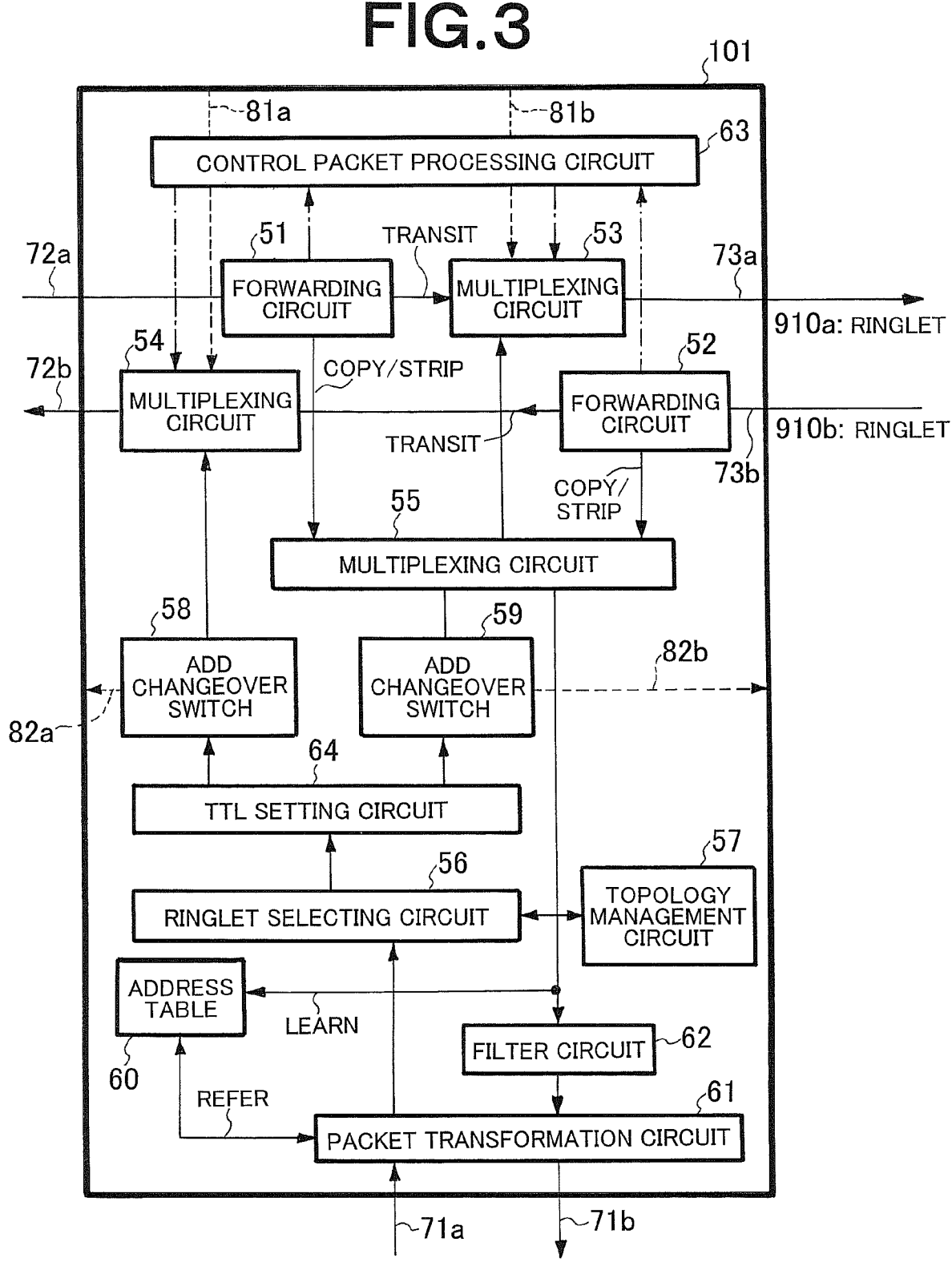
FIG. 3 is an explanatory diagram showing a configuration example of a node.

FIG. 3 is an explanatory diagram showing a configuration example of a node. Descriptions will now be made to the configuration of the node and to the processing of each constituent element when it is set in a redundancy incompatible mode, with reference to FIG. 3. In FIG. 3, the node is identified as a node 101.

The node 101 includes forwarding circuits 51, 51, multiplexing circuits 53 to 55, a ringlet selecting circuit 56, a topology management circuit 57, Add changeover switches (multiplexing circuit switch) 58 and 59, an address table 60, a packet transformation circuit 61, a filter circuit 62, a control packet processing circuit 63 and a TTL setting circuit 64.

The node 101 includes the forwarding circuit 51 and the multiplexing circuit 53 which correspond to the ringlet 910a, and includes also the forwarding circuit 52 an the multiplexing circuit 54 which correspond to the ringlet 910b. The forwarding circuit 51 is connected to the ringlet 910a through a port 72a, while the multiplexing circuit 53 is connected to the ringlet 910a through a port 73a. The forwarding circuit 52 is connected to the ringlet 910b through a port 73b, while the multiplexing circuit 54 is connected to the ringlet 910b through a port 72b.

Client ports 71a and 71b are connected to the client device 904 (not illustrated in FIG. 3).

In a redundancy incompatible mode, the control packet processing circuit 63 outputs a control packet to the multiplexing circuit (s) (either one or both of the multiplexing circuits 53 and 54) corresponding to the ringlet for forwarding the control packet. Upon reception of a control packet input from the forwarding circuits 51 and 52, the control packet processing circuit 63 implements a process in accordance with the kind of the received control packet.

The forwarding circuits 51 and 52 refer to an RPR MAC DA of the forwarded RPR packet. If this RPR MAC DA is the same as the RPR MAC address of its own node (node 101 in the example of FIG. 3), the circuits take the RPR packet from the ring. If the RPR packet is a data packet, the forwarding circuits 51 and 52 output the packet to the multiplexing circuit 55. On the contrary, if the RPR packet is a control packet, the circuits output the packet to the control packet processing circuit 63. In this embodiment, "Strip" is meant to take or strip (delete) the packet forwarded from the ringlet from the ring in order to be output to the client device or the control packet processing circuit 63. As will be described later, in a redundancy compatible mode, a stripped RPR packet may not possibly be forwarded to the client device. The RPR MAC address of its own node may be stored in the forwarding circuits 51 and 52, for example. A memory unit (not illustrated) included in the node may store the RPR MAC address of its own node.

If the forwarded RPR packet is a broadcast packet, the forwarding circuits 51 and 52 forward the broadcast packet to both the client device and the ringlet. Note that "Transit" is meant to transit a packet forwarded from a ringlet to this ringlet. In this embodiment, "Copy" is meant to generate the same packet as a packet forwarded from a ringlet in order to forward the packet thereto and to output the packet to the client device or the control packet processing circuit 63. As will be described later, in a redundancy compatible mode, a copied RPR packet may not possibly be forwarded to the client device. If the forwarded RPR packet is a broadcast packet, the forwarding circuits 51 and 53 transit (transmit) the packet and copies the RPR packet. If the copied RPR packet is a data packet, the circuits output the packet to the multiplexing circuit 55. On the contrary, if the copied RPR packet is a control packet, the circuits output the packet to the control packet processing circuit 63.

If the forwarded RPR packet is not any one of the above packets, the forwarding circuits 51 and 52 transit the forwarded packet to the same ringlet.

The multiplexing circuit 55 multiplexes the packet forwarded from each ringlet (each of the forwarding circuits 51 and 52) to the client device, and outputs the packet to the filter circuit 62 and the address tale 60.

The filter circuit 62 receives a packet from the multiplexing circuit 55, and determines whether or not to output the packet to the packet transformation circuit 61. In this setting (i.e. redundancy incompatible mode), the filter circuit 62 permits the passage of the packet sent from the multiplexing circuit 55, and outputs the packet to the packet transformation circuit 61.

The address table 60 stores the MAC address of the client device and the RPR MAC address of the node in the ring, in association with each other. The address table 60 functions as an FDB. The address table 60 learns and stores the corresponding relationship between the RPR MAC SA (source address of the node in the ring) in a RPR packet received from the multiplexing circuit 55 and the MAC SA of an encapsulated user data packet in the RPR packet. The MAC SA of the encapsulated user data packet in the RPR packet is a MAC address of the client device (not illustrated in FIG. 3) which has sent the user data packet.

The packet transformation circuit 61 receives a packet forwarded from each ringlet (forwarding circuits 51 and 52) to the client device, through the filter circuit 62. The packet transformation circuit 61 receives a packet in the state of an RPR packet, and takes a user data packet from the RPR packet (i.e. to decapsulate the packet). The packet transformation circuit 61 outputs the user data packet from a client port 71*b*, and forwards the packet to the client device.

The packet transformation circuit 61 receives a user data packet from the client device 904 (see FIG. 2 and not illustrated in FIG. 3) through the client port 71*a*. At this time, the packet transformation circuit 61 refers to the address table 60 to search for an RPR MAC address corresponding to the MAC DA in the received user data packet. If there is entry (i.e. the address has successfully been searched), the packet transformation circuit 61 encapsulates the user data packet while setting the searched RPR MAC address as an RPR MAC DA.

If there is no entry (i.e. the address has not successfully been searched), the circuit encapsulates the user data packet while setting the broadcast address as an RPR MAC DA. In this case, the MAC DA of the user data packet to be encapsulated is not a broadcast address. However, the RPR MAC DA of the RPR packet resulted from encapsulation of the user data packet is a broadcast address. Such an RPR packet is called an Unknown unicast-packet. The packet transformation circuit 61 sets the RPR MAC DA, and outputs the encapsulated packet to the ringlet selecting circuit 56.

If the packet sent from the packet transformation circuit 61 is a unicast-packet (excluding the Unknown unicast-packet), the ringlet selecting circuit 56 refers to the topology management circuit 57, selects a ringlet for sending the packet to a destination node through the shortest path, and outputs the packet. If the packet sent from the packet transformation circuit 61 is a broadcast packet, the ringlet selecting circuit 56 selects a ringlet in accordance with a predetermined forwarding technique (unidirectional flooding or bi-directional flooding). The ringlet selecting circuit 56 sets the selected ringlet for an RPR packet, and outputs the RPR packet to the TTL setting circuit 64.

The topology management circuit 57 stores and manages the RPR MAC address of each of the nodes arranged in a clockwise direction in the ring including its own node and the RPR MAC address of each of the nodes arranged in a counter-clockwise direction therein.

The TTL setting circuit 64 sets a TTL value for the packet sent from the ringlet selecting circuit 56. At this time, the TTL setting circuit 64 refers to the topology management circuit 57. If the packet is a unicast-packet, the circuit sets the number of hops in a range from its own node to a destination node, as a TTL value. If the packet is a broadcast packet, the circuit sets a TTL value so as to avoid duplication of packet arrival and loss of packet in the ring. The TTL setting circuit 64 outputs the packet having the set TTL value to the multiplexing circuit (either the multiplexing circuit 53 or the multiplexing circuit 54) corresponding to the ringlet selected by the ringlet selecting circuit 56. If both of the ringlets have been selected by the ringlet selecting circuit 56, the TTL setting circuit 64 outputs the packet to both of the multiplexing circuit 53 and the multiplexing circuits 54.

The TTL setting circuit 64 counts the number of hops, supposing that the virtual redundant node including a combination of two nodes is one node.

The TTL setting circuit 64 outputs a packet to the multiplexing circuit 54 through the Add changeover switch 58, and also outputs a packet to the multiplexing circuit 53 through the Add changeover switch 59. When a redundancy incompatible mode has been set, the Add changeover switch 58 outputs the packet from the TTL setting circuit 64 to the multiplexing circuit 54. Similarly, when a redundancy incompatible mode has been set, the Add changeover switch 59 outputs the packet from the TTL setting circuit 64 to the multiplexing circuit 53.

The multiplexing circuit 53 multiplexes a packet from the client (the packet from the Add changeover switch 59) and a packet from the ring (the packet output by the forwarding circuit 51), and sends the multiplexed packets to the ringlet 910*a*. Similarly, the multiplexing circuit 54 multiplexes a packet from the client (the packet from the Add changeover switch 58) and a packet from the ring (the packet output by the forwarding circuit 52), and sends the multiplexed packets to ringlet 910*b*.

Internode ADD interfaces 81*a*, 81*b*, 82*a* and 82*b* do not contribute to the packet forwarding, in an RPR node redundancy incompatible mode.

The node 101 which has been set in a redundancy incompatible mode implements operations in accordance with IEEE 802.17 based on the above-described operations of each constituent element.

Figure 4:
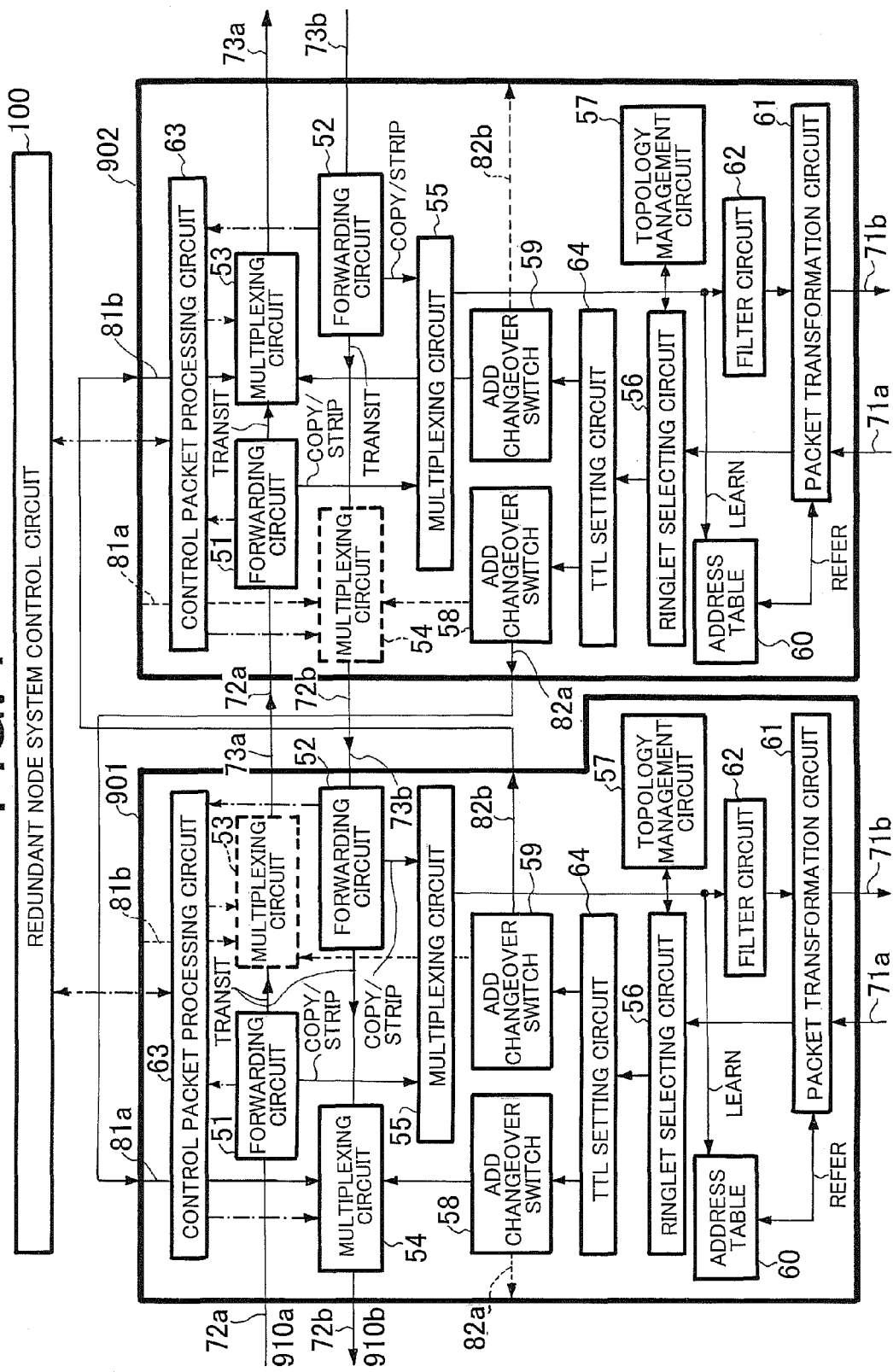
FIG. 4 is an explanatory diagram showing a virtual redundant node formed of a combination of two nodes.

FIG. 4 is an explanatory diagram showing a virtual redundant node formed of a combination of two nodes having the configuration of FIG. 3. The same constituent elements are identified by the same reference numerals of FIG. 3. Each node of the virtual redundant node is set in a redundancy compatible mode. Thus, the node includes the constituent element which carries out an operation different from the operation described with reference to FIG. 3. The operations that are the same as those described with reference to FIG. 3 will not be described again. In FIG. 4, the two nodes included in the virtual redundant node are identified as a node 901 and a node 902. In the example of FIG. 4, the node 901 is a West Node and is set in a redundancy compatible mode for West Node in accordance with superior provisioning setting by, for example, a non-illustrative personal computer. The node 902 is the East Node, and is set in a redundancy compatible mode for East Node in accordance with superior provisioning setting. As described above, the same RPR node ID (RPR MAC address) is given to the two node of the virtual redundant node 903.

In the description below, the reference numeral may be followed by an alphabetic symbol "W", when representing a constituent element of the West Node 901. Similarly, the reference numeral may be followed by an alphabetic symbol "E", when representing a constituent element of the East Node 902.

In the virtual redundant node shown in FIG. 4, the ports 73*a* and 73*b* of the West Node 901 are connected respectively to the ports 72*a* and 72*b* of the East Node 902. The internode ADD interface 82*b* of the West Node 901 is connected to the internode ADD interface 81*b* of the East Node 902 so that packets can be sent from the Add changeovers witch 59W of the West Node 901 to the multiplexing circuit 53E of the West Node 902. Similarly, the internode ADD interface 82*a* of the East Node 902 is connected to the internode ADD interface 81*a* of the West Node 901 so that packets can be sent from the Add changeover switch 58E of the East Node 902 to the multiplexing circuit 54W of the West Node 901. The internode ADD interfaces 81*a*, 81*b*, 82*a* and 82*b* are interfaces for connecting the Add changeover switch of one node to the multiplexing circuit of the other node, in the virtual redundant node.

The virtual redundant node includes a redundant node system control circuit 100. The redundant node system control circuit 100 is connected to the control packet processing circuit 63 of each of the nodes 901 and 902.

The client device 904 (see FIG. 1, and not illustrated in FIG. 4) is connected to the client ports 71*a* and 71*b* of the nodes 901 and 902, and is redundantly connected to the ring. At this time, link aggregation is applied so as to avoid packet loops.

Descriptions will now be made to case a wherein there is no failure in each link for connecting the client device 904 and the nodes 901 and 902 (i.e. in a normal state).

In a normal state, every time the client device 904 sends a user data packet, it determines a destination node to send the user data packet in accordance with a predetermined rule, and sends the user data packet to the determined node. This rule so specifies that the client device 904 send the user data packet not just one of the nodes 901 and 902. Therefore, the client device 904 distributes the user data packet to the nodes 901 and 902, thus improving resource utilization efficiency. The client device 904 may send the user data packet to only either one of the nodes 901 and 902, in a normal state. In this case, the other node does not receive the user data packet from the client device 904. Thus, an improvement in the resource utilization can not be expected. It is preferred that the client device 904 determine a destination node to send the user data packet in accordance with the rule, every time it sends the user data packet.

When the redundancy compatible mode is set, of the Add changeover switches of a node which first receives the RPR packet from one ringlet, the Add changeover switch which receives an RPR packet to be forwarded to its ringlet from the TTL setting circuit 64 outputs the RPR packet input from the TTL setting circuit 64 to the multiplexing circuit of the other node which sends the packet to its ringlet. Therefore, upon reception of the RPR packet to be forwarded to the ringlet 910*a* from the TTL setting circuit 64W, the Add changeover switch 59W which has been set in the redundancy compatible mode for West Node outputs this RPR packet to the multiplexing circuit 53E of the node 902. Similarly, upon reception of the RPR packet to be forwarded to the ringlet 910*b* from the TTL setting circuit 64E, the Add changeover switch 58E which has been set in the redundancy compatible mode for East Node outputs this RPR packet to the multiplexing circuit 54W of the node 901. As a result of this, of the multiplexing circuits of the node which first receives the RPR packet from one ringlet, the multiplexing circuit (the multiplexing circuits 53W and 54E) which receives a packet from the ringlet does not receive the RPR packet from the Add changeover switch.

When the redundancy compatible mode has been set, of the Add changeover switches of the node which first receives the RPR packet from one ringlet, the Add changeover switch which receives the RPR packet to be forwarded to the other ringlet from the TTL setting circuit 64 outputs the RPR packet from the TTL setting circuit 64 to the multiplexing circuit in the same node sending the packet to the other ringlet. Thus, upon reception of the RPR packet to be forwarded to the ringlet 910*b* from the TTL setting circuit 64W, the Add changeover switch 58W which has been set in the redundancy compatible mode for West Node outputs this RPR packet to the multiplexing circuit 54W in its own node. Similarly, upon reception of the RPR packet to be forwarded to the ringlet 910*a* from the TTL setting circuit 64E, the Add changeover switch 59E which has been set in the redundancy compatible mode for East Node outputs this RPR packet to the multiplexing circuit 53E in its own node.

In the redundancy compatible mode, of the multiplexing circuits of the node which first receives the RPR packet from one ringlet, the multiplexing circuit which sends the packet to the other ringlet multiplexes not only the RPR packet transited from the forwarding circuit of its own node and the RPR packet generated based on the user data packet from the client device, but also the RPR packet output from the other node included in the same virtual redundant node. Thus, the multiplexing circuit 54W which has been set in the redundancy compatible mode for West Node multiplexes not only the RPR packet from the forwarding circuit 52W and the RPR packet from the Add changeover switch 58W, but also the RPR packet from the Add changeover switch 58E of the node 902. Similarly, the multiplexing circuit 53E which has been set in the redundancy compatible mode for East Node multiplexes not only the RPR packet from the forwarding circuit 51E and the RPR packet from the Add changeover switch 59E, but also the RPR packet from the Add changeover switch 59W of the node 901.

Of the RPR packets which have been generated based on the user data packets forwarded from the client device, the RPR packets to be forwarded to the ringlet 910*a* are multiplexed all by the multiplexing circuit 53E. Of the RPR packets generated based on the user data packets forwarded from the client device, the RPR packets to be forwarded to ringlet 910*b* are multiplexed all by the multiplexing circuit 54W. In this manner, the multiplexing circuits which multiplex the packets from the client device are localized in the multiplexing circuits 53E and 54W, thereby maintaining impartiality of the packets multiplexed (Add) so as to be forwarded to the ringlets. Suppose that the packets from the client device are multiplexed by both of the multiplexing circuits 53W and 53E corresponding to the ringlet 910*a*. In this case, before the multiplexing circuit 53E multiplexes the packets, the multiplexing circuit 53W multiplexes the packets. If an amount of packets to be forwarded exceeds the maximum value as a result of multiplexing by the multiplexing circuit 53W, the multiplexing circuit 53E can not multiplex the packets from the client device. That is, the multiplexing is implemented with priority by the multiplexing circuit 53W. In other words, the multiplexing circuit 53E may not be able to multiplex the packets, thus failing to maintain the impartiality of the multiplexing of packets. This problem can be solved by localizing the multiplexing circuits which multiplex the packets from the client device. The multiplexing circuits 53E and 54W which multiplex the packets from the client device may refer to the packets and multiplex the packets in order of priority given thereto, for example, when multiplexing the packets from the client device.

The same RPR MAC addresses are given to the nodes 901 and 902. Upon reception of packets multiplied (Add) by the multiplexing circuit 53W from the client device, the forwarding circuit 51E discriminates that the received packet is one sent by its own node so as to discard the packet. This problem can be solved by localizing the multiplexing circuits which multiplex the packets from the client device, in the multiplexing circuits 53E and 54W.

When the redundancy compatible mode has been set, the filter circuit determines whether or not to permit the passage of an RPR packet (s), in accordance with whether its own node is a West Node or East Node and also in accordance with which ringlet an input RPR packet is Dropped from. Specifically, the filter circuit permits the passage of the RPR packet Dropped (Stripped or Copied) from the ringlet through which its own node is to first receive the RPR packet, and does not permit the passage of an RPR packet Dropped from the other ringlet. Hence, the filter circuit 62W which has been set in the redundancy compatible mode for West Node permits the passage of the RPR packet which has been stripped or copied from the ringlet 910a, and outputs it to the packet transformation circuit 61W. The filter circuit 62W does not permit the passage of the RPR packet which has been stripped or copied from the ringlet 910b, and prohibits output of the packet to the packet transformation circuit 61W. Similarly, the filter circuit 62E which has been set in the redundancy compatible mode for East Node permits the passage of the RPR packet which has been stripped or copied from the ringlet 910b, and outputs it to the packet transformation circuit 61E. The filter circuit 62E does not permit the passage of the RPR packet which has been stripped or copied from the ringlet 910a, and prohibits output of the packet to the packet transformation circuit 61E.

When the redundancy compatible mode has been set, each of the forwarding circuits 51W, 52W, 51E and 52E operates in accordance with whether its own node is a West Node or East Node or in accordance with attributes of the forwarded packet (e.g. it is a data packet, a control packet, a unicast-packet or a broadcast packet).

FIG. 5 is an explanatory diagram showing operations of the forwarding circuit of each node. FIG. 6 to FIG. 9 are flowcharts showing operations of the forwarding circuit in each state. Operations of the forwarding circuit in the redundancy compatible mode setting will now be described with reference to FIG. 5 to FIG. 9.

FIG. 5 shows two nodes "a node which first receives an RPR packet from a ringlet" and "the other node". In the following descriptions, the "node which first receives an RPR packet from a ringlet" corresponds to the West Node which first receives the RPR packet from the ringlet 910a, while "the other node" corresponds to the East Node 902. Note that the "node which first receives the RPR packet from the ringlet" may correspond to the East Node 902 which first receives the RPR packet from the ringlet 910b, while "the other node" may correspond to the West Node 901. Even in this case, operations are implemented the same, except that they are mainly implemented by the forwarding circuits 52E and 52W in place of the forwarding circuits 51W and 51E.

In FIG. 5, "state 1" represents a state wherein a unicast-packet whose destination address differs from its own node address is forwarded from the ringlet 910a to the West Node 901. In this case, own node address indicates an RPR MAC address which is common to the nodes 901 and 902. FIG. 6 is a flowchart showing operations of the forwarding circuits 51W and 51E in "state 1". Upon reception of the unicast packet whose destination address differs from its own node address from the ringlet 910a, the forwarding circuit 51W does not subtracts any value from the TTL value of its unicast-packet, and sends (Transits) the forwarded packet to the same ringlet 910a (Step S11). Even if the TTL value of the received unicast-packet is "0" (zero), the forwarding circuit 51W sends (Transits) the packet to the same ringlet 910a, maintaining the TTL value as is (Step S11). Then, the forwarding circuit 51E receives the unicast-packet from the West Node 901. The forwarding circuit 51E subtracts 1 from the TTL value of the unicast-packet received from the West Node 901, and sends (Transits) the unicast-packet to the same ringlet 910a (Step S12). In Step S12, if the TTL value of the received unicast-packet is "0", the forwarding circuit 51E does not transit the packet, but discards the unicast-packet.

In FIG. 5, "state 2" represents a state wherein a broadcast packet whose TTL value is not "0" is forwarded from the ringlet 910a to the West Node 901. FIG. 7 is a flowchart showing operations of the forwarding circuits 51W and 51E in "state 2". Upon reception of the broadcast packet whose TTL value is not "0" from the ringlet 910a, the forwarding circuit 51W transits the broadcast packet to the ringlet 910a from which the packet has been forwarded without subtracting any value from the TTL value of its broadcast packet, and generates (Copies) the same packet as this packet (Step S21). Then, the forwarding circuit 51E receives the broadcast packet from the West Node 901. The forwarding circuit 51E subtracts "1" from the TTL value of the broadcast packet received from the West Node 901, and implements a transit process and a copy process (Step S22). That is, the circuit sends the received broadcast packet to the ringlet 910a from which the packet has been forwarded, and generates the same packet as the packet.

In "state 2", the broadcast packet copied in Step S21 and S22 are input to the respective filter circuits 62W and 62E, as long as they are data packets. In this case, the filter circuit 62W permits the passage of the packet, while the filter circuit 63E prohibits the passage of the packet. Thus, the user data packet decapsulated from the broadcast packet is sent to the client device only from the West Node 901. As a result, duplication of packet arrival can be prevented in the client device. The broadcast packets copied in Step S21 and Step S22 are input to the control packet processing circuits 63W and 63E, as long as they are control packets. The control packet processing circuits 63W and 63E implement processes in accordance with the kind of the input control packet.

Figure 8:
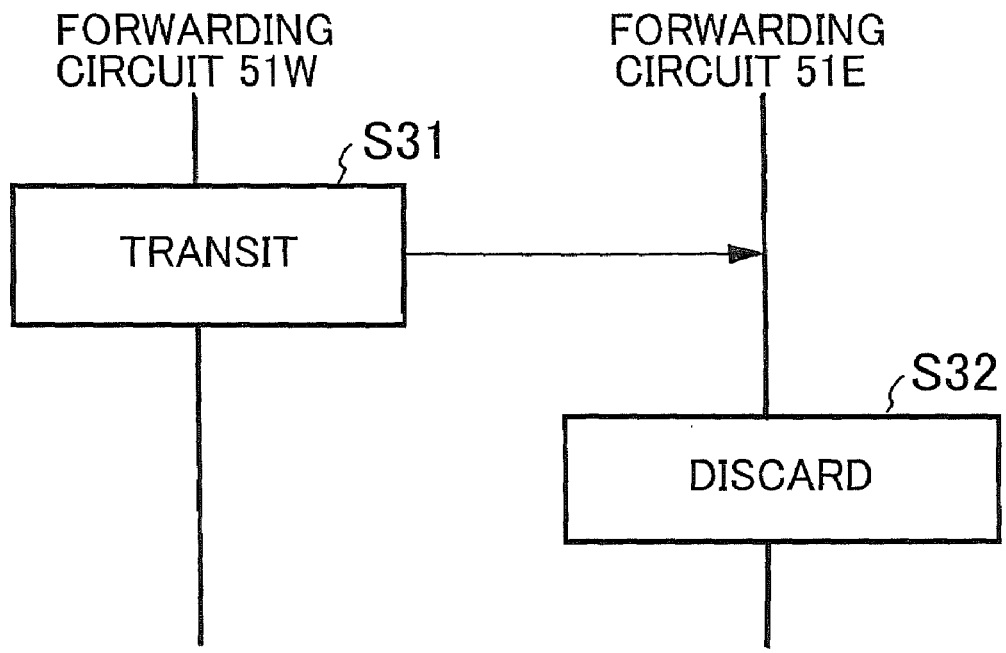
FIG. 8 is a flowchart showing operations of the forwarding circuits 51W and 51E in state 3.

In FIG. 5, "state 3" represents a state wherein a broadcast control packet (a control packet to be broadcasted) whose TTL value is "0" is forwarded from the ringlet 910a to the West Node 901. FIG. 8 is a flowchart showing operations of the forwarding circuits 51W and 51E in "state 3".

Upon reception of a broadcast control packet whose TTL value is "0" from the ringlet 910a, the forwarding circuit 51W sends (Transits) the broadcast control packet to the ringlet 910a from which the packet has been forwarded (Step S31). Upon reception of this broadcast control packet (TTL value is "0"), the forwarding circuit 51E discards the received packet (Step S32).

Figure 9:
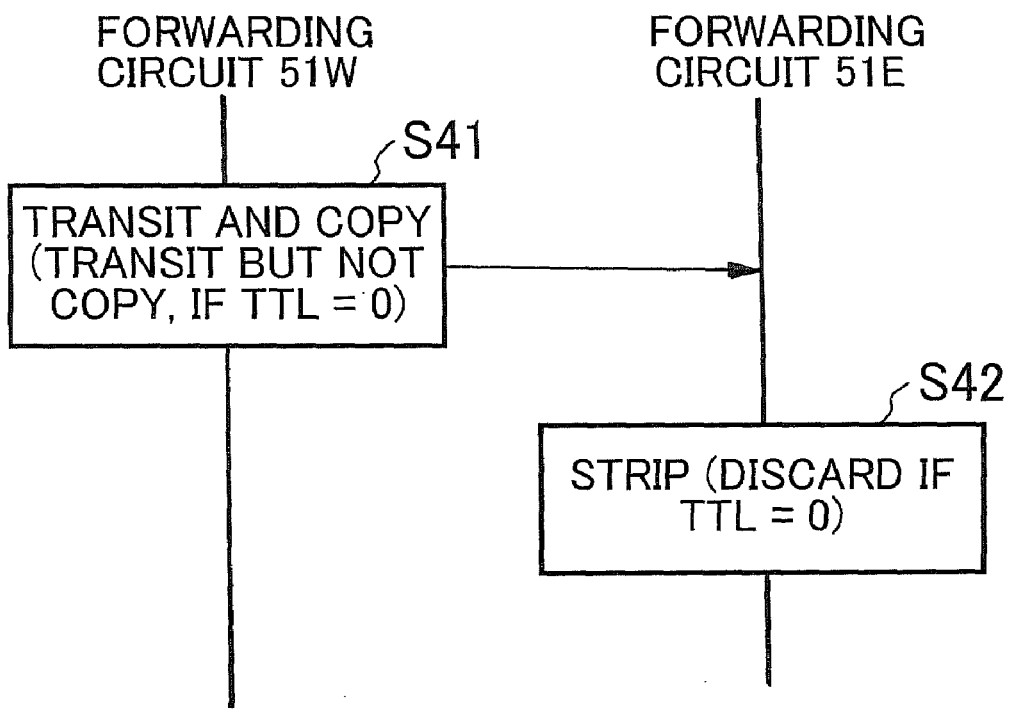
FIG. 9 is a flowchart showing operations of the forwarding circuits 51W and 51E in state 4.

In FIG. 5, "state 4" represents a state wherein a unicast control packet (control packet to be unicasted) whose destination address is the same as its own node address, from the ringlet 910*a* to the West Node 901. FIG. 9 is a flowchart showing operations of the forwarding circuits 51W and 51E in "state 4". Upon reception of a unicast control packet whose destination address is the same as its own node address from the ringlet 910*a*, the forwarding circuit 51W transits the unicast control packet to the ringlet 910*a* from which the packet has been forwarded, and Copies the same packet as the unicast control packet (Step S41). However, if the TTL value is "0", the forwarding circuit 51W does not copy the packet but rather transits the packet. That is, the circuit does not generate the same packet as the packet whose TTL value is "0", but sends the received unicast control packet to the ringlet 910*a* from which the packet has been forwarded. The forwarding circuit 51E receives the unicast control packet from the West Node 901. The forwarding circuit 51E takes (Strips) the unicast control packet received from the West Node 901 from the ringlet 901*a* (Step S42). If its TTL value is "0", the forwarding circuit 51E does not strip the packet but rather discards the received unicast control packet.

In "state 4", the unicast control packet copied in Step S41 is output from the forwarding circuit 51W to the control packet processing circuit 63W, and the control packet processing circuit 63W executes processes in accordance with the kind of the control packet. Similarly, the unicast control packet stripped in Step S42 is output from the forwarding circuit 51E to the control packet processing circuit 63E, and the control packet processing circuit 63E executes processes in accordance with the kind of the control packet.

In FIG. 5, "state 5" represents a state wherein a broadcast data packet whose TTL value is "0" is forwarded from the ringlet 910*a* to the West Node 901. The operations of the forwarding circuits 51W and 51E in "State 5" are the same as the operations shown in FIG. 8. That is, upon reception of a broadcast data packet whose TTL value is "0" from the ringlet 910*a*, the forwarding circuit 51W sends (Transits) this broadcast data packet to the ringlet 910*a* from which the packet has been forwarded. Upon reception of this broadcast data packet (TTL value is "0"), the forwarding circuit 51E discards the received packet.

In FIG. 5, "state 6" represents a state wherein a unicast data packet whose destination address is the same as its own node address is forwarded from the ringlet 910*a* to the West Node 901. The operations of the forwarding circuits 51W and 51E in "state 6" are the same as the operations shown in FIG. 9. That is, upon reception of a unicast data packet whose destination address is the same as its own node address from the ringlet 910*a*, the forwarding circuit 51W sends (Transits) this unicast data packet to the ringlet 910*a* from which the packet has been forwarded, and generates (copies) the same packet as this packet. However, if its TTL value is "0", the forwarding circuit 51W does not copy the packet but rather transits the packet. That is, the circuit does not copy the same packet as the packet whose TTL value is "0", but rather sends the received unicast data packet to the ringlet 910*a* from which the packet has been forwarded. The forwarding circuit 51E receives the unicast data packet from the West Node 901. The forwarding circuit 51E takes (Strips) the unicast data packet received from the West Node 901 from the ringlet 910*a*. However, if its TTL value is "0", the forwarding circuit 51E does not strip the packet but rather discards the received unicast data packet.

In "state 6", the unicast data packet copied by the forwarding circuit 51W is input to the filter circuit 62W, and the filter circuit 62W permits the passage of the packet. The unicast data packet stripped by the forwarding circuit 51E is input to the filter circuit 62E, and the filter circuit 62E prohibits the passage of the packet. Hence, the user data packet decapsulated from the unicast data packet is sent only from the West Node 901 to the client device. This can avoid duplication of packet arrival in the client device.

Descriptions will now be made to a control packet processing unit 63, when the redundancy compatible mode has been set. As explained in "state 2" and "state 4", if a copied or stripped packet is a control packet, the forwarding circuits (the forwarding circuits 51W and 51E in the above example) output the control packet to the control packet processing circuit 63 in its own node. The control packet processing circuit 63 executes a process (for analyzing information or the like) in accordance with the kind of the input control packet. The control packet processing circuit 63 implements, for example, topology discovery, protection, OAM (Operation, Administration and Maintenance), etc., in accordance with the kind of the control packet. Such processes are implemented independently by each of the nodes 901 and 902. If a virtual redundant node 103 needs to implement an interaction process with the control packet, the redundant node system control circuit 100 implements the interaction process, and the control packet processing circuit 63 implements a process for sending/receiving the control packet.

When the redundancy compatible mode has been set, if the unicast control packet is to be sent, the control packet processing unit 63 outputs the unicast control packet only to a multiplexing circuit corresponding to the ringlet which is opposed to the ringlet from which the RPR packet is forwarded first to its own node. For example, the control packet processing circuit 63W outputs the unicast control packet only to the multiplexing circuit 54W corresponding to the ringlet 910*b*. The control packet processing circuit 63E outputs the unicast control packet only to the multiplexing circuit 53E corresponding to the ringlet 910*a*. Upon determination that it is time to send the unicast control packet, or upon reception of an instruction for sending the unicast control packet from the operator through an information processor (not illustrated), the redundant node system control circuit 100 controls the control packet processing circuit 63 to send the unicast control packet. Note that this control packet processing circuit 63 is included in the node corresponding to the ringlet from which the unicast control packet should be sent.

The redundant node system 100 may implement a process for informing one control packet processing circuit 63 about a processed result of the other control packet processing circuit 63 in the virtual redundant node.

The above descriptions have been made to the case where there is no failure in each link for connecting the client device 904 and each of the nodes 901 and 902, in a normal state. When the redundancy compatible mode has been set, if a failure has occurred in one of the links for connecting the client device 904 and each of the nodes 901 and 902, each constituent element of the node connected to the link with the failure operates the same. In the node connected to the link without any failure, operations of the filter circuit 62 are changed from its normal operations. Upon reception of information representing that a failure has occurred in the link between the other node which is paired with its own node and the client device, the filter circuit 62 permits the passage of the RPR packet, regardless of from which ringlet the RPR packet has been Dropped (Stripped or Copied).

Of the two nodes 901 and 902 included in the virtual redundant node, the client device sends a user data packet only to a node connected to the link without failure.

Descriptions will now be made to an operation for forwarding an RPR packet having various attributes (whether a data packet, a control packet, a unicast packet or a broadcast packet, etc) with reference to FIG. 4. Any other forwarding operations are done in accordance with IEEE 802.17.

Operations of the node 101 (see FIG. 2) which has been set in the redundancy incompatible mode are those prescribed in IEEE 802.17, and are well known to the skilled in the art, thus will not be explained here.

Descriptions will now be made to the case wherein there is no failure in each link for connecting the client device 904 with the nodes 901 and 902.

The nodes 901 and 902 shown in FIG. 4 are set respectively in the redundancy compatible mode for West Node and the redundancy compatible mode for East Node, for example, by a superior management system at the activation. As described above, the information processor, such as a personal computer, etc. may set the nodes 901 and 902 into the redundancy compatible mode for West Node and the redundancy compatible mode for East Node.

The operation for forwarding a broadcast data packet will be implemented as follows.

The client device (see FIG. 1 and not illustrated in FIG. 4) determines a destination node to which a user data packet is sent, in accordance with a rule, and sends the user data packet to the determined node. Thus, each of the nodes 901 and 902 may receive the user data packet from the client device.

The packet transformation circuit 61 of either one of the nodes 901 and 902 sets a broadcast address as an RPR MAC DA, and encapsulates the user data packet so as to generate a broadcast data packet. Note that the packet transformation circuit 61 generates a broadcast data packet, for example, when the MAC DA of the user data packet is a broadcast address or when it fails to search an RPR MAC address corresponding to the MAC DA of the user data packet.

The ringlet selecting circuit 56 determines a target ringlet to which the broadcast data packet generated by the packet transformation circuit 61 is sent, and adds information of the ringlet to the broadcast data packet (Specifically, the information is added to "ri" as a sub-field of a "Base Control" field shown in FIG. 15). Subsequently, the TTL setting circuit 64 sets the TTL value. Further, the broadcast data packet to be sent to the ringlet 910a is output to the multiplexing circuit 53E, while the broadcast data packet to be sent to the ringlet 910b is output to the multiplexing circuit 54W. Specifically, when the TTL setting circuit 64W outputs the broadcast data packet, the TTL setting circuit 64W outputs the broadcast data packet to be sent to the ringlet 910a to the multiplexing circuit 53E through the Add circuit 59W. The TTL setting circuit 64W outputs the broadcast data packet to be sent to the ringlet 910b to the multiplexing circuit 54W through the Add changeover switch 58W. When the TTL setting circuit 64E outputs the broadcast data packet, the TTL setting circuit 64E outputs the broadcast data packet to be sent to the ringlet 910a to the multiplexing circuit 53E through the Add changeover switch 59E. The TTL setting circuit 64E outputs the broadcast data packet to be sent to the ringlet 910b to the multiplexing circuit 54W through the Add changeover switch 58E. The multiplexing circuit 53E multiplexes the input broadcast packets, and outputs them to the ringlet 910a. Similarly, the multiplexing circuit 54W multiplexes the input broadcast packets, and outputs them to the ringlet 910b.

Suppose that the broadcast data packet sent to the ringlet 910a from a virtual redundant node other than the virtual redundant node 903 (see FIG. 1) is forwarded to the virtual redundant node 903. In this case, the forwarding circuit 51W shown in FIG. 4 receives the broadcast data packet from the ringlet 910a. The subsequent operations depend on as to whether the TTL value is "0".

Upon reception of a broadcast data packet whose TTL value is not "0", the forwarding circuit 51W sends (Transits) the broadcast data packet to the ringlet 910a from which the packet has been sent, without subtracting any value of the TTL value. The forwarding circuit 51W generates (Copies) the same packet as this data packet. This process corresponds to Step S21 of FIG. 7. The forwarding circuit 51W outputs the copied packet to the multiplexing circuit 55W. The multiplexing circuit 55W multiplexes the broadcast data packet copied by the forwarding circuit 51W and the copied packet from the ringlet 910b, and outputs the packets to the filter circuit 62W and the address table 60W. The filter circuit 62W permits the passage of the copied packet from the ringlet 910a. Thus, the broadcast data packet copied by the forwarding circuit 51W is output to the packet transformation circuit 61W. At this time, the filter circuit 62W may determine whether the copied broadcast data packet is from the ringlet 910a, by referring to "ri (Ringlet Identifier)" that is a sub-field of Base Control field of the broadcast data packet. The packet transformation circuit 61W decapsulates the broadcast packet, and outputs the packet to the client device 904 (see FIG. 1 and not illustrated in FIG. 4). The address table 60W refers to the broadcast data packet, learns the corresponding relationship between its RPR MAC SA and the MAC SA of the user data packet, and registers the corresponding relationship.

The broadcast data packet sent to the ringlet 910a by the forwarding circuit 51W is received by the forwarding circuit 51E. The forwarding circuit 51E subtracts 1 from the TTL value of the received broadcast data packet, and sends (Transits) the broadcast data packet to the ringlet 910a from which the packet has been forwarded. The forwarding circuit 51E generates (Copies) the same packet as this data packet. This process corresponds to Step S22 of FIG. 7. The forwarding circuit 51E outputs the copied packet to the multiplexing circuit 55E. The multiplexing circuit 55E multiplexes the broadcast data packet copied by the forwarding circuit 51E and the copied or stripped packet from the ringlet 910b, and outputs the packets to the filter circuit 62E and the address table 60E. The filter circuit 62E prohibits the passage of the copied packet from the ringlet 910a. Thus, the broadcast data packet copied by the forwarding circuit 51E is not output to the packet transformation circuit 61E. Hence, the user data packet is not sent from the packet transformation circuit 61E to the client device 904. The filter circuit 62E may determine that the copied broadcast data packet has been sent from the ringlet 910a, by referring to "ri" as the sub-field of Base Control field. The address table 60E refers to the broadcast data packet, learns the corresponding relationship between the RPR MAC SA and the MAC SA of the user data packet, and registers the corresponding relationship. The address tables 60W and 60E store the same learned contents. The broadcast data packet sent to the ringlet 910a by the forwarding circuit 51E is sequentially forwarded in the ring, until the TTL value becomes "0" or until it is discarded by "Source Strip". The "Source Strip" in this case represents that the packet is discarded in a node whose source address (RPR MAC SA) is its own address. In this embodiment, a "Source Strip" operation is effective both in the redundancy compatible mode and in the redundancy incompatible mode.

As described above, only one of the nodes 901 and 902 (the node 901 in the above example) sends a user data packet to the client device, thus avoiding duplication of user data packet arrival to the client device.

Upon reception of a broadcast data packet whose TTL value is "0", the forwarding circuit 51W sends (Transit) the forwarded broadcast data packet to the ringlet 910a from which the packet has been sent, even if the TTL value is "0". This process is the same as Step S31 of FIG. 8. The broadcast data packet (TTL value is "0") which is sent to the ringlet 910a by the forwarding circuit 51W is received by the forwarding circuit 51E. The forwarding circuit 51E discards this broadcast packet. This process is the same as Step S32 of FIG. 8.

The descriptions have exemplarily been made to the case wherein the broadcast data packet sent to the ringlet 910a is forwarded to the virtual redundant node 903. In the operation for forwarding the broadcast data packet sent to the ringlet 910b to the virtual redundant node 903, the same processes as above are implemented except that the forwarding circuit 52E first receives the broadcast data packet so as to implement the processes.

The forwarding operation of a unicast data packet is implemented as follows.

Assume that the packet transformation circuit 61 of either one of the nodes 901 and 902 encapsulates a user data packet so as to generate a unicast data packet. The ringlet selecting circuit 56 determines a ringlet to which the unicast data packet generated by the packet transformation circuit 61 is sent, and adds its ringlet information to "ri" of the unicast data packet. Subsequently, the TTL setting circuit 64 sets a TTL value, and outputs a unicast data packet to be sent to the ringlet 910a to the multiplexing circuit 53E, and outputs also a unicast data packet to be sent to the ringlet 910b to the multiplexing circuit 54W. The state of outputting the unicast packet from the TTL setting circuit 64 to the multiplexing circuit 53E or multiplexing circuit 54W is the same as the case of the broadcast data packet, thus will now be not described here.

Assume that the unicast data packet sent from a virtual redundant node other than the virtual redundant node 903 (see FIG. 1) to the ringlet 910a is forwarded to the virtual redundant node 903. In this case, the forwarding circuit 51W shown in FIG. 4 receives the unicast data packet from the ringlet 910a. The subsequent operations depend on whether the RPR MAC DA (destination address) of the unicast data packet is the same as the RPR MAC address of each node included in the virtual redundant node 903.

Assume that the forwarding circuit 51W receives a unicast data packet whose RPR MAC DA is the same as the RPR MAC address of its own node. In this case, the forwarding circuit 51W confirms that the RPR MAC DA of the unicast data packet is the same as the RPR MAC address of its own node, and sends (Transits) this unicast data packet to the ringlet 910a from which the packet has been forwarded. The forwarding circuit 51W generates (Copies) the same packet as this unicast data packet. However, if its TTL value is "0", the forwarding circuit 51W does not copy the packet but rather transit the packet. That is, the circuit sends the received unicast data packet to the ringlet 910a from which the packet has been forwarded, without generating the same packet as the packet having a TTL value of "0". This process is the same as Step S41 of FIG. 9. The forwarding circuit 51W outputs the copied packet to the multiplexing circuit 55W. The multiplexing circuit 55W multiplexes the unicast data packet copied by the forwarding circuit 51W and the copied packet from the ringlet 910b, and outputs the packets to the filter circuit 62W and the address table 60W. The filter circuit 62W permits the passage of the copied packet from the ringlet 910a. Thus, the unicast data packet copied by the forwarding circuit 51W is output to the packet transformation circuit 61W. At this time, the filter circuit 62W may determine that the unicast data packet has been copied from the ringlet 910a, by referring to "ri" of the unicast data packet. The packet transformation circuit 61W decapsulates this unicast packet, and outputs it to the client device 904 (see FIG. 1 and not illustrated in FIG. 4). The address table 60W, learns the corresponding relationship between the RPR MAC SA and the MAC SA of the user data packet by referring to the unicast data packet, and registers the corresponding relationship.

The unicast data packet sent to the ringlet 910a by the forwarding circuit 51W is received by the forwarding circuit 51E. The forwarding circuit 51E confirms that the RPR MAC DA of the received unicast data packet is the same as the RPR MAC address of its own node, and takes (Strips) the unicast data packet from the ringlet 910a. However, if its TTL value is "0", the forwarding circuit 51E does not strip the packet but rather discards the received unicast data packet. This process is the same as Step S42 of FIG. 9. The forwarding circuit 51E outputs the stripped packet to the multiplexing circuit 55E. The multiplexing circuit 55E multiplexes the unicast data packet copied by the forwarding circuit 51E and the copied or stripped packet from the ringlet 910b, and outputs the packets to the filter circuit 62E and the address table 60E. The filter circuit 62E prohibits the passage of the stripped packet from the ringlet 910a. Thus, the unicast data packet stripped by the forwarding circuit 51E is not output to the packet transformation circuit 61E. Hence, the user data packet is not sent from the packet transformation circuit 61E to the client device 904. The filter circuit 62E may also determine that the unicast data packet has been stripped from the ringlet 910a, by referring to "ri". The address table 60E learns the corresponding relationship between its RPR MAC SA and the MAC SA of the user data packet by referring to the unicast data packet, and registers the corresponding relationship. Therefore, the address tables 60W and 60E stores the same learned contents.

As described above, only either one of the nodes 901 and 902 (the node 901 in the above example) sends the user data packet to the client device, thus avoiding duplication of arrival of the user data packet to the client device.

Assume that the forwarding circuit 51W receives a unicast data packet whose RPR MAC DA is not the same as the RPR MAC address of its own node. In this case, the forwarding circuit 51W confirms that the RPR MAC DA of the unicast data packet is not the same as the RPR MAC address of its own node, sends (Transit) this unicast data packet to the ringlet 910a from which the packet has been forwarded. At this time, the forwarding circuit 51W sends this unicast data packet without subtracting any value from its TTL value. This process corresponds to Step S11 of FIG. 6. The forwarding circuit 51W does not discard the received unicast data packet even if its TTL value is "0", and implements the same transit process. The unicast data packet sent to the ringlet 910a by the forwarding circuit 51W is received by the forwarding circuit 51E. The forwarding circuit 51E confirms that the RPR MAC DA of the unicast data packet is not the same as the RPR MAC address of its own node, and subtracts "1" from the TTL value of the unicast data packet. The forwarding circuit 51E sends (Transit) the unicast data packet to the ringlet 910a from which the packet has been forwarded. However, if the TTL value of the received unicast data packet is "0", the forwarding circuit 51E discards this unicast packet. This process corresponds to Step S12 of FIG. 6.

The descriptions have been made to the case where the unicast data packet sent to the ringlet 910a is forwarded to the virtual redundant node 903. In the operation for forwarding the unicast data packet sent to the ringlet 910b to the virtual redundant node 903, the same processes as above are implemented except that the forwarding circuit 52E first receives the unicast data packet so as to implement the processes.

As described above, when the address table of one node learns the corresponding relationship between the RPR MAC SA and the MAC SA of the user data packet, the address table of the other node also learns the corresponding relationship therebetween.

The operation for forwarding a broadcast control packet is implemented as follows.

When to output a broadcast control packet, the control packet processing circuit 63 set in the redundancy compatible mode outputs the control packet to both of the multiplexing circuits 53 and 54 of its own node. The control packet processing circuit 63 sets the RPR MAC address of its own node as a RPR MAC SA in its broadcast control packet. Upon reception of a broadcast control packet input from the control packet processing circuit 63, the multiplexing circuits 53 and 54 send the broadcast control packets respectively to the ringlets 910*a* and 910*b*. The same RPR MAC addresses are assigned to the two nodes 901 and 902 of the virtual redundant node. Thus, the broadcast control packet sent to the ringlet 910*a* by the multiplexing circuit 53W is discarded (Source Stripped) by the forwarding circuit 51E. Similarly, the broadcast control packet sent to the ringlet 910*b* by the multiplexing circuit 54E is discarded (Source Strip) by the forwarding circuit 52W. Thus, the broadcast control packet generated by the control packet processing circuit 63W is forwarded to another virtual redundant node by the ringlet 910*b*. Similarly, the broadcast control packet generated by the control packet 63E is forwarded to another virtual redundant node by the ringlet 910*a*.

Assume that a broadcast control packet which has been sent to the ringlet 910*a* from a virtual redundant node other than the virtual redundant node 903 (see FIG. 1) is forwarded to the virtual redundant node 903. In this case, the forwarding circuit 51W shown in FIG. 4 receives a broadcast data packet from the ringlet 910*a*. The subsequent operations depend on as to whether the TTL value is "0" or not.

Upon reception of a broadcast control packet whose TTL value is not "0", the forwarding circuit 51W sends the broadcast control packet to the ringlet 910*a* (Transit) from which the packet has been forwarded, without subtracting any value from the TTL value. The forwarding circuit 51W generates (Copies) the same packet as the control packet. This process corresponds to Step S21 of FIG. 7. The forwarding circuit 51W outputs the copied broadcast control packet to the control packet processing circuit 63W. The control packet processing circuit 63W implements a process in accordance with the kind of this control packet.

The broadcast control packet sent to the ringlet 910*a* by the forwarding circuit 51W is received by the forwarding circuit 51E. The forwarding circuit 51E subtracts "1" from the TTL value of the received broadcast control packet, and sends (Transits) this broadcast control packet to the ringlet 910*a* from which the packet has been forwarded. The forwarding circuit 51E generates (Copies) the same packet as this control packet. This process corresponds to Step S22 of FIG. 7.

The forwarding circuit 51E outputs the copied broadcast control packet to the control packet processing circuit 63E. The control packet processing circuit 63E implements a process in accordance with the kind of this control packet. The broadcast control packet sent to the ringlet 910*a* by the forwarding circuit 51E is sequentially forwarded in the ring, until the TTL value become "0" or until it is discarded by "Source Strip".

Upon reception of a broadcast control packet whose TTL value is "0", the forwarding circuit 51W sends (Transit) this broadcast control packet to the ringlet 910*a* from which the packet has been forwarded, even if its TTL value is "0". This process corresponds to Step S31 of FIG. 8. The broadcast control packet (whose TTL value is "0") sent to the ringlet 910*a* by the forwarding circuit 51W is received by the forwarding circuit 51E. The forwarding circuit 51E discards this broadcast packet. This process corresponds to Step S32 of FIG. 8.

The descriptions have been made to the case where the broadcast control packet sent to the ringlet 910*a* is forwarded to the virtual redundant node 903. In the operation for forwarding the broadcast control packet sent to the ringlet 910*b* to the virtual redundant node 903, the same processes as above are implemented except that the forwarding circuit 53E first receives the broadcast control packet so as to implement the processes.

The operation for forwarding a unicast control packet is done in the following manner.

As described above, when the redundancy compatible mode has been set, the control packet processing circuit 63W outputs a unicast control packet only to the multiplexing circuit 54W corresponding to the ringlet 910*b*. The control packet processing circuit 63W outputs the unicast control packet only to the multiplexing circuit 54W corresponding to the ringlet 910*b*. When the virtual redundant node 903 sends the unicast control packet to the ringlet 910*a*, the control packet processing circuit 63E outputs the unicast control packet to the multiplexing circuit 53E. Then, the multiplexing circuit 53E multiplexes the unicast control packets, and send them to the ringlet 910*a*. When the virtual redundant node 903 sends a unicast control packet to the ringlet 910*b*, the control packet processing circuit 63W outputs a unicast control packet to the multiplexing circuit 54W. Then, the multiplexing circuit 54W multiplexes the unicast control packets, and sends them to the ringlet 910*b*.

Assume that the unicast control packet sent to the ringlet 910*a* from a virtual redundant node other than the virtual redundant node 903 (see FIG. 1) is forwarded to the virtual redundant node 903. In this case, the forwarding circuit 51W shown in FIG. 4 receives the unicast control packet from the ringlet 910*a*. The subsequent operations depend on as to whether the RPR MAC DA of the unicast control packet is the same as the RPR MAC address of each node included in the virtual redundant node 903.

Assume that the forwarding circuit 51W receives a unicast control packet whose RPR MAC DA is the same as the RPR MAC address of its own node. In this case, the forwarding circuit 51W confirms that the RPR MAC DA of the unicast control packet is the same as the RPR MAC address of its own node, and sends (Transit) the unicast control packet to the ringlets 910*a* from which the packet has been forwarded. The forwarding circuit 51W generates (Copy) the same packet as this unicast control packet. However, if the TTL value is "0", the forwarding circuit 51W does not copy the packet but rather transit it. That is, the circuit does not generate the same packet as a packet whose TTL value is "0", and sends the received unicast control packet to the ringlet 910*a* from which the packet has been forwarded. This process corresponds Step S41 of FIG. 9. The forwarding circuit 51W outputs the copied control packet to the control packet processing circuit 63W. The control packet processing circuit 63W implements a process in accordance with the kind of the control packet.

The unicast control packet sent to the ringlet 910*a* by the forwarding circuit 51W is received by the forwarding circuit 51E. The forwarding circuit 51E confirms that the RPR MAC DA of the received unicast control packet is the same as the RPR MAC address of its own node, and takes (Strip) the unicast control packet from the ringlet 910a. However, if the TTL value is "0", the forwarding circuit 51E discards the received unicast control packet without stripping the packet. This process corresponds to Step S42 of FIG. 9. The forwarding circuit 51E outputs the stripped control packet to the control packet processing circuit 63E. The control packet processing circuit 63E implements a process in accordance with the kind of this control packet.

Assume that the forwarding circuit 51W receives a unicast control packet whose RPR MAC DA is not the same as the RPR MAC address of its own node. In this case, the forwarding circuit 51W confirms that the RPR MAC DA of the unicast control packet is not the same as the RPR MAC address of its own node, and sends (Transit) this unicast control packet to the ringlet 910a from which the packet has been forwarded. At this time, the forwarding circuit 51W sends the packet without subtracting any value from the TTL value of the unicast control packet. This process corresponds to Step S11 of FIG. 6. The forwarding circuit 51W does not discard the packet but rather implements the same transit process, even if the TTL value of the received unicast control packet is "0". The unicast control packet sent to the ringlet 910a by the forwarding circuit 51W is received by the forwarding circuit 51E. The forwarding circuit 51E confirms that the RPR MAC DA of the unicast control packet is not the same as the RPR MAC address of its own node, and subtracts "1" from the TTL value of this unicast control packet. Then, the forwarding circuit 51E sends (Transit) the unicast control packet to the ringlet 910a from which the packet has been forwarded. However, if the TTL value of the received unicast control packet is "0", the forwarding circuit 51E discards the unicast packet. This process corresponds to Step S12 of FIG. 6.

The descriptions have been made to the case where the unicast control packet sent to the ringlet 910a is forwarded to the virtual redundant node 903. In the operation for forwarding the unicast control packet sent to the ringlet 910b to the virtual redundant node 903, the same processes as above are implemented except that the forwarding circuit 52E first receives the unicast control packet so as to implement the processes.

Each of the control packet processing circuits 63W and 63E of each node 901 and 902 in the virtual redundant node 903 outputs the broadcast control packet or unicast control packet in response to an instruction from the redundant node system control circuit 100. The redundant node system control circuit 100 selects one or both of the control packet processing circuits 63W and 63E, based on the ringlet for sending the broadcast control packet or unicast control packet, and controls the selected control packet processing circuit to output a broadcast control packet or unicast control packet. Each of the control packet processing circuits 63W and 63E outputs all kinds of control packets in accordance with IEEE 802.17, in response to an instruction of the redundant node system control circuit 100. In this manner, each of the control packet processing circuits 63W and 63E outputs the control packet, thereby virtually and comprehensively recognizing the virtual node 903 as one node for outputting various control packets to the ring.

Descriptions will now be made to an operation when there is a failure in a link between the client device and either one of the two nodes included in the virtual redundant node. In the following descriptions, assume that there is a failure in a link between the West Node 901 and the client device. However, the same operation can be applied even when there is a failure in a link between the East Node 902 and the client device.

Even upon detection of a link failure, the node (the West Node 901 in this example) with a failure in a link connected to the client device continues to implement the same operation as that before detection of the link failure.

FIG. 10 is a flowchart showing operations of a client device in a link failure. FIG. 11 is a flowchart showing operations of a node (the East Node in this example) of the two nodes which has no failure in a link to the client device.

The client device detects that a failure has occurred in a link connected to one node (the West Node 901) (Step S61). When to send a user data packet, the client device sends the user data packet only to a node (the East Node 902 in this example) connected to a link having no failure therebetween (Step S62).

The node (the East Node 902) having no link failure in the link connected to the client device gets information representing that a link failure has occurred between the other node and the client device (Step S71). For example, a failure detection unit (not illustrated) can be provided. This failure detection unit detects the occurrence of a failure in a link between each of the nodes 901 and 902 and the client device. When this failure detection unit detects a link failure, it may inform the node connected to the client device through a link without any failure about the occurrence of the link failure. The node and the client device connected to the link with the failure can detect a link failure by themselves.

The node which has been informed of the link failure in Step S71 so changes the operation of the filter circuit 62 of its own node that the filter circuit 62 of its own node permits the passage of packets from any ringlets (Step S72). For example, upon reception of the information in Step 71, the East Node 902 so changes the operation of the filter circuit 62E that the filter circuit 62E permits the passage of packets from any ringlets. Operations of the constituent elements other than the filter circuit 62E are the same as those when there is no link failure (in the normal state).

Upon occurrence of a link failure between the client device and the West Node 901, the client device sends a user data packet only to the East Node 902. The East Node 902 implements the same operation for this user data packet as the operation in the normal state, and sends this packet to the ring. That is, the packet transformation circuit 61E encapsulates the packet so as to generate an RPR Packet. Then, the ringlet selecting circuit 56E determines a ringlet to which the RPR packet is sent. The TTL setting circuit 64E sets a TTL, and outputs the RPR packet to a multiplexing circuit corresponding to the determined ringlet. That is, when to send the packet to the ringlet 910a, the TTL setting circuit 64E outputs the RPR packet to the multiplexing circuit 53E through the Add changeover switch 59E. When to send the packet to the ringlet 910b, the TTL setting circuit 64E outputs the RPR packet to the multiplexing circuit 54W through the Add changeover switch 58E. The multiplexing circuits 53E and 54W multiplex the RPR packets input from the TTL setting circuits 64E, and send them to the ringlet. Thus, even if the client device sends the user data packet only to the East Node 902, the virtual redundant node can send the RPR packet both to the ringlets 910a and 910b.

The below describes an operation to be implemented differently from an operation of the case where no link failure has occurred, when the nodes 901 and 902 of the virtual redundant node 903 receive an RPR packet sent from a virtual redundant node other than the virtual redundant node 903 (see FIG. 1). That is, a different operation is implemented when a user data packet needs to be sent from the virtual redundant node 903 to the client device. In more particular, the different operations are implemented both when receiving a broadcast data packet whose TTL value is not "0" and when receiving a unicast data packet having an RPR MAC DA which is the same as the RPR MAC address of its own node. The operation when receiving another RPR packet is the same as that when no link failure has occurred.

Even upon reception of a broadcast data packet whose TTL value is not "0" or even upon reception of a unicast data packet having an RPR MAC DA which is the same as the RPR MAC address of its own node, the same operations of the forwarding circuits 51W, 52W, 51E and 52E are implemented as the operations when no link failure has occurred in the link between the West Node 901 and the client device 904 (see FIG. 1). Thus, upon reception of a broadcast data packet whose TTL value is not "0" or upon reception of a unicast data packet having an RPR MAC DA which is the same as the RPR MAC address of its own node, each of the forwarding circuits 51W, 52W, 51E, and 52E implements a process for generating (Copy) and outputting the same packet as the received RPR packet or a process for taking (Strip) the received RPR packet from the ring, similarly to the case where there is no link failure. As described above, as long as the TTL value is "0", the copy process or strip process is not implemented, even upon reception of the unicast data packet having an RPR MAC DA which is the same as the RPR MAC address of its own node.

The forwarding circuit 51W or forwarding circuit 52W of the West Node 901 connected to a link having a failure outputs a copied or stripped RPR packet to the address table 60W and the filter circuit 62W through the multiplexing circuit 55W. The address table 60W and the filter circuit 62W implement the same operation as their operation when no link failure has occurred. The filter circuit 62W outputs the RPR packet from the ringlet 910a to the packet transformation circuit 61W. The packet transformation circuit 61W decapsulates the RPR packet and tries to output the user data packet to the client device. However, because a link failure has occurred, the user data packet can not arrive at the client device. That is, when no link failure has occurred, the packet sent from the ringlet 910a can be sent to the client device. On the contrary, such a packet cannot be sent to the client device.

The forwarding circuit 51E or forwarding circuit 52E of the East Node 902 connected to a link having no failure outputs the copied or stripped RPR packet to the address table 60E and the filter circuit 62E through the multiplexing circuit 55E. The address table 60E implements the same operation as the operation when there is no link failure. Upon reception of information representing the link failure in the West Node 901, the operation of the filter circuit 62E is so changed as to permit the passage of the copied or stripped RPR packet from any of the ringlets 910a and 910b (see Step S72 of FIG. 11). Thus, the filter circuit 62E outputs both of the RPR packets sent from the ringlet 910a and the RPR packet sent from the ringlet 910b, to the packet transformation circuit 61E. The packet transformation circuit 61E decapsulates the RPR packet input from the filter circuit 62E, and sends a user data packet to the client device. In this manner, the packet sent from each of the ringlets 910a and 910b is forwarded to the client device by the East Node 902.

Therefore, the packet sent to the client device by the West Node 901 when there is no link failure is sent to the client device by the East Node 902 after a link failure has occurred. On the contrary, when a link failure has occurred in the link of the node 901, a user data packet can be sent from another node to the client device.

As described above, when no link failure has occurred, the address tables 60W and 60E store the same learned contents. Even if the client device is changed from a state where it distributes user data packets both to the nodes 901 and 902 to a state where a user data packet is sent only to a node without a link failure, the address table of the node without a link failure has already stored the learned contents so as unlikely to fail to search for the RPR MAC DA. When a link failure has occurred, it is necessary to change the operation of only one filter circuit, thus rapidly recovering the failure.

If the client device sends user data to a node without a link failure, the virtual redundant node 903 can send an RPR node to any ringlets. By changing the operation of the filter circuit of the node without a link failure, a user data packet of the RPR packet forwarded from another virtual redundant node can be sent to the client device. Therefore, the failure can be recovered without having an effect on the operation of another node in the ring.

In the node of this embodiment, for example, a superior provisioning setting technique is used for changing operations of the forwarding circuits 51 and 52, the multiplexing circuits 53 and 54, the Add changeover switches 58 and 59 and the filter circuit 62. Thus, even when the client device is connected to only one node, or even when the client device is connected to two nodes which are made redundant, the nodes can have the common configuration. This results in improving the efficiency in the node development and the efficiency in the inventory control.

In the first embodiment, a receiver (receiving portion) is realized by the forwarding circuits 51 and 52. An address storage unit is realized by the address table 60. A sender (sending portion) for client device is realized by the packet transformation circuit 61. A filter is realized by the filter circuit 62. A multiplexer is realized by 53E and 54W. A packet generator is realized by the packet transformation circuit 61. A destination switch is realized by the TTL setting circuit 64 and the Add changeover switches 58 and 59. A first receiver is realized by the forwarding circuit 51. A second receiver is realized by the forwarding circuit 52. A first multiplexer is realized by the multiplexing circuit 53. A second multiplexer is realized by the multiplexing circuit 54.

Second Embodiment

Figure 12:
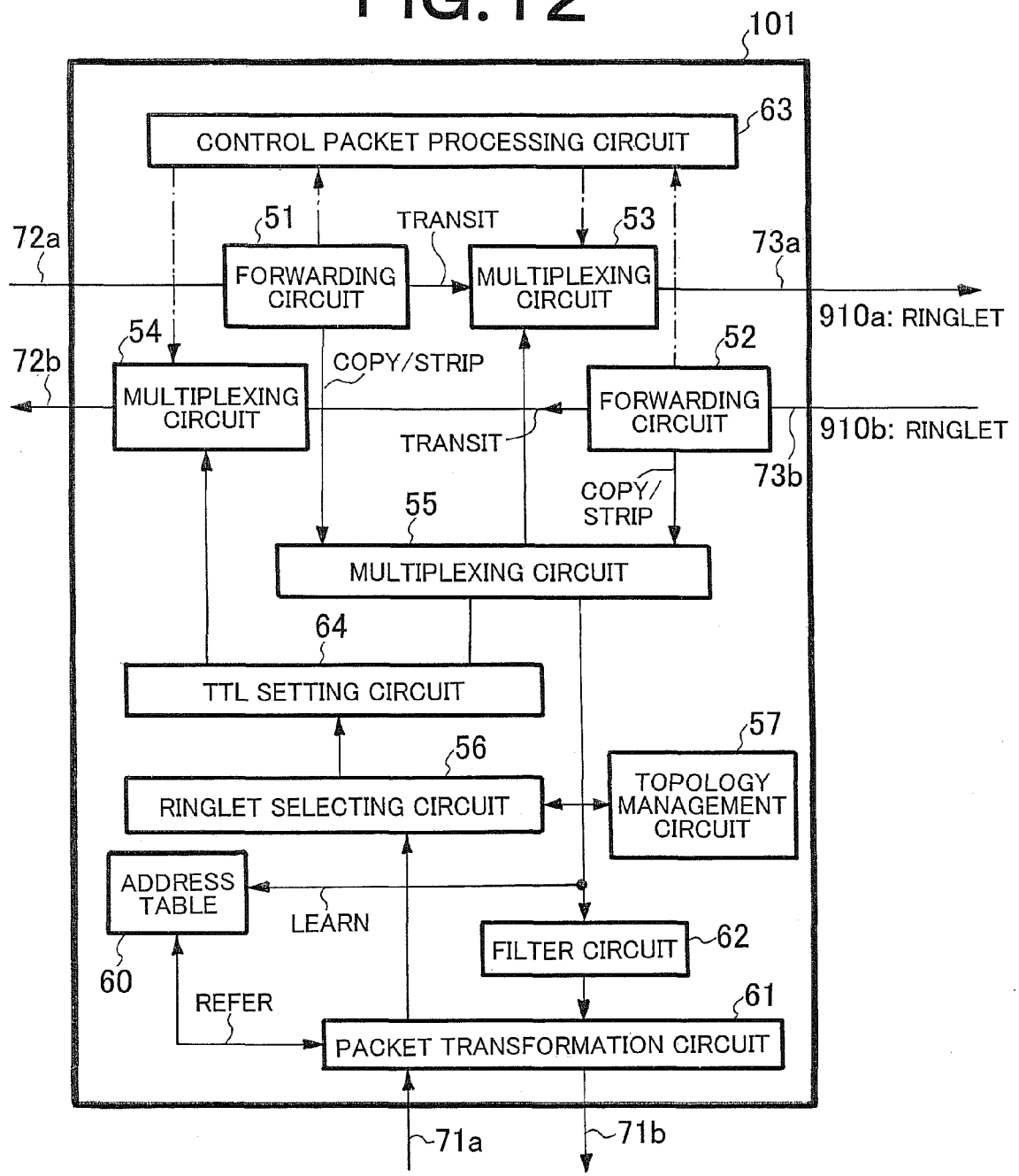
FIG. 12 is an explanatory diagram showing a configuration example of a node according to a second embodiment of the present invention.

FIG. 12 is an explanatory diagram exemplarily showing a configuration of a node according to a second embodiment of the present invention. The same constituent elements are identified by the same reference numerals of FIG. 3, thus will not specifically be described again here. The node according to the second embodiment does not include the Add changeover switches 58 and 59 (see FIG. 3), thus differs from the node of the first embodiment. When set in a redundancy incompatible mode, operations of the constituent elements (forwarding circuits 51 and 52, multiplexing circuits 53 to 55, ringlet selecting circuit 56, topology management circuit 57, address table 60, packet transformation circuit 61, filter circuit 62, control packet processing circuit 63 and TTL setting circuit 64) are the same as those of the first embodiment when set in a redundancy incompatible mode. Operations of the node when it is set in a redundancy incompatible mode are the operations in accordance with IEEE 802.17, thus will not be explained here.

Figure 13:
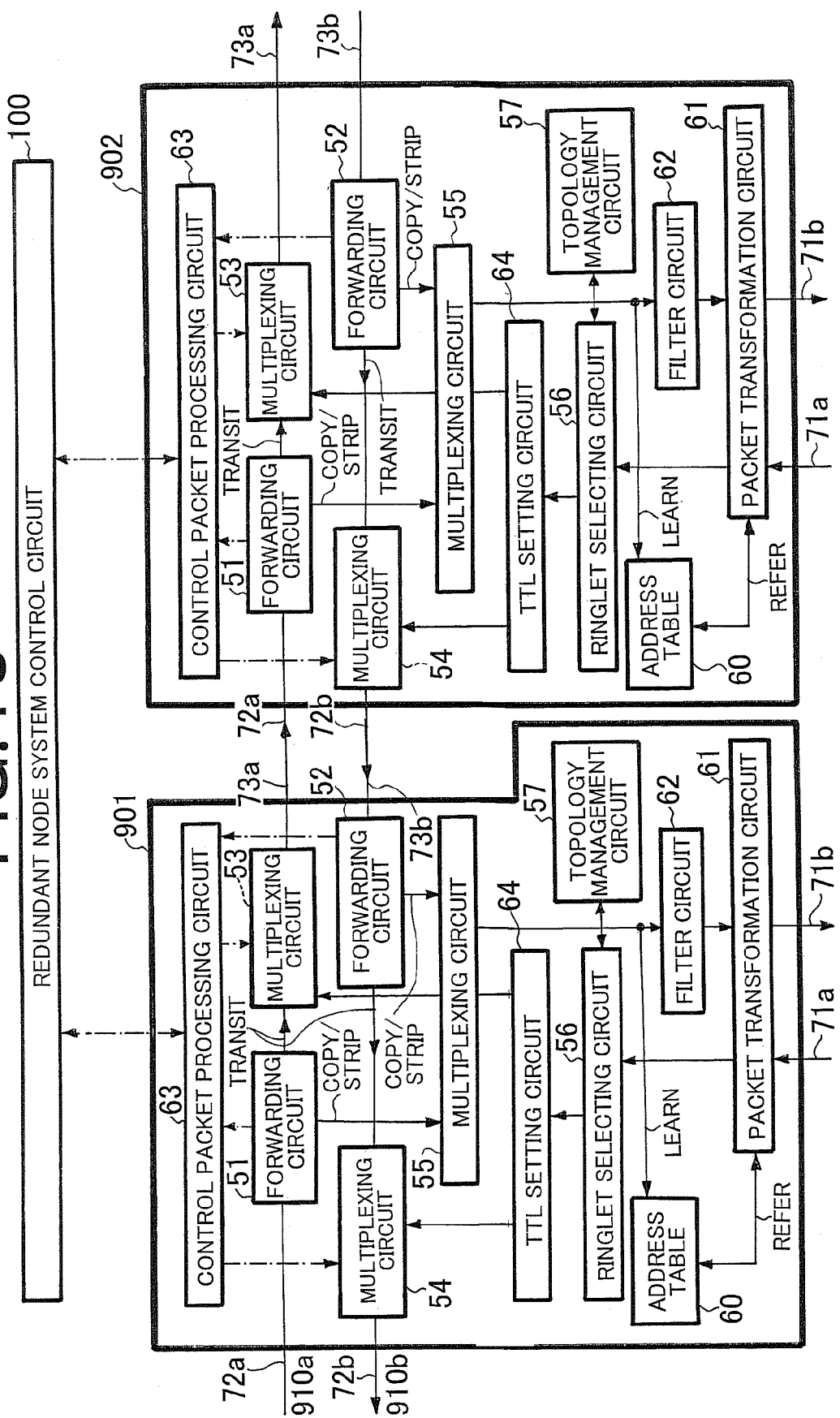
FIG. 13 is an explanatory diagram showing a virtual redundant node formed of a combination of two nodes.
Figure 14:
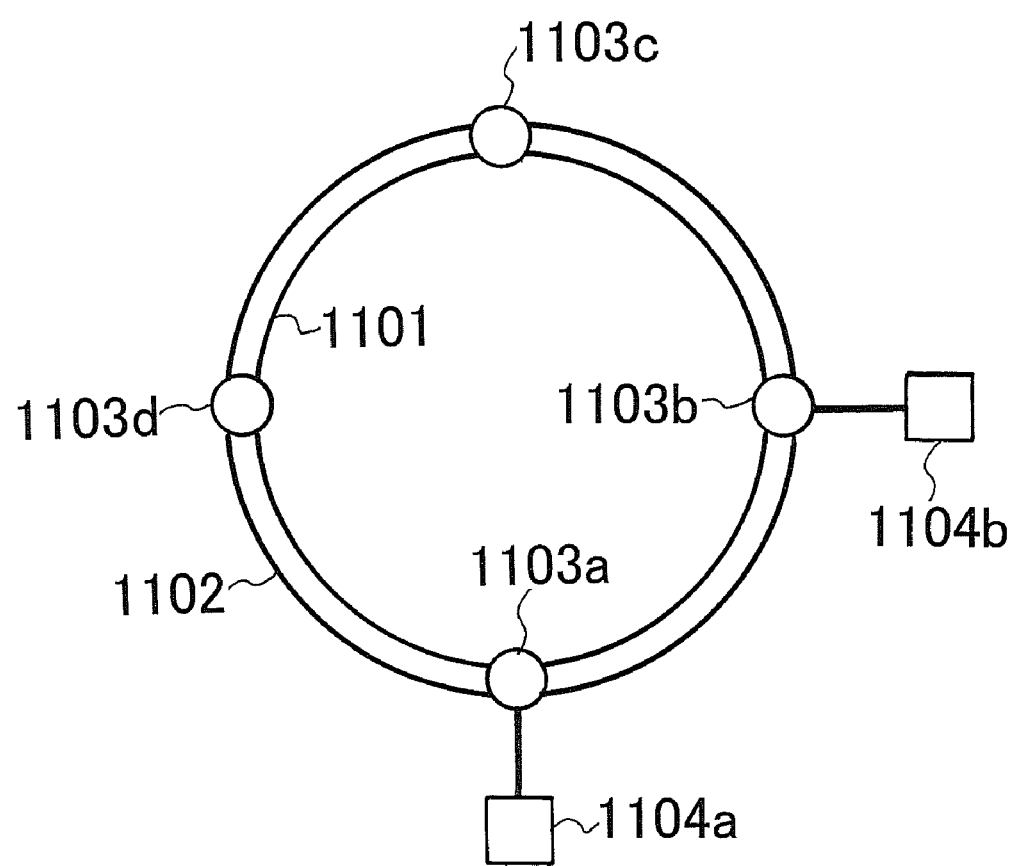
FIG. 14 is an explanatory diagram showing an example of a network configuration of an RPR.
Figure 16A:
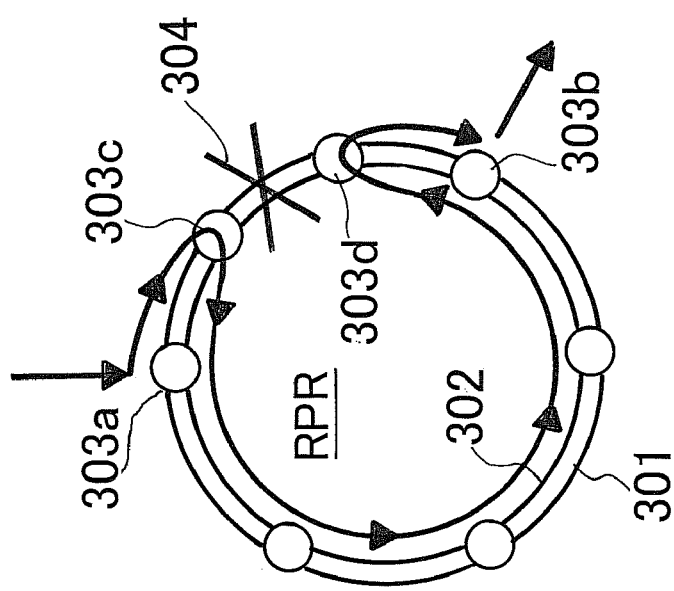
FIGS. 16A to 16C are an explanatory diagram showing protection operations for the RPR.
Figure 16B:
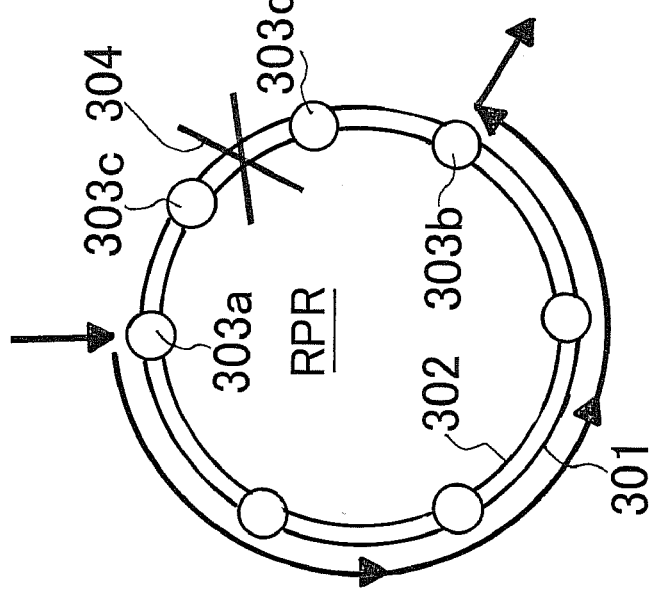
Figure 16C:
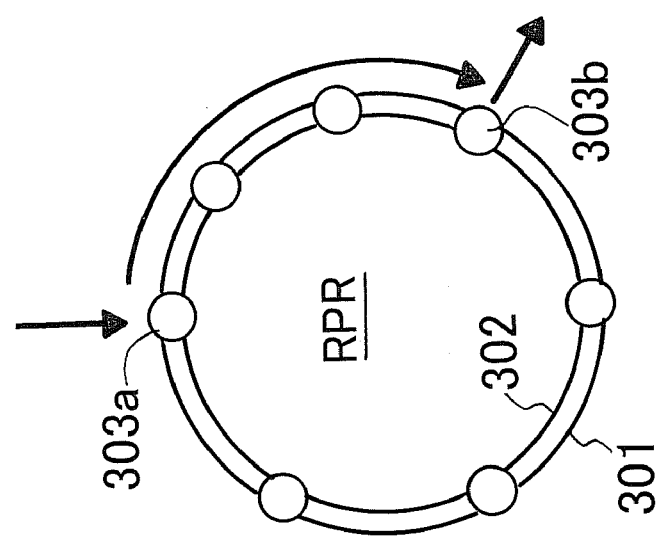

FIG. 13 is an explanatory diagram showing a virtual redundant node having a combination of two nodes whose configuration is shown in FIG. 12. The same constituent elements as those shown in FIG. 12 and FIG. 4 are identified by the same reference numerals of FIG. 12 and FIG. 4, and are not specifically be described here. The nodes 901 and 902 which are used as a virtual redundant node are set in a redundancy compatible mode. Like the first embodiment, the same RPR node ID (RPR MAC address) is given to the two nodes included in the virtual redundant node. The node is set in the redundancy incompatible mode or redundancy compatible mode in accordance with the superior provisioning setting technique, like the first embodiment.

Descriptions will now be made to operations of the node that are different from the operations in the first embodiment, when set in a redundancy compatible mode.

The TTL setting circuit 64 of each of the nodes 901 and 902 outputs RPR packets input from the ringlet selecting circuit 56 to a multiplexing circuit of its own node which corresponds to a ringlet selected by the ringlet selecting circuit 56. That is, the TTL setting circuit 64 of each node outputs the RPR packets to the multiplexing circuit 53 of its own node when the ringlet 910*a* has been selected. On the contrary, the TTL setting circuit 64 of each node outputs RPR packets to the multiplexing circuit 54 of its own node, when the ringlet 910*b* has been selected. When the ringlets 910*a* and 910*b* are both selected (for example, at the transmission of broadcast data packets), the circuit outputs RPR packets to each of the multiplexing circuits 53 and 54 of its own node.

The control packet processing circuit 63 of each of the nodes 901 and 902 outputs control packets to the multiplexing circuit of its own node corresponding to the sending ringlet of the control packet. That is, the control packet processing circuit 63 of each node outputs the control packets to the multiplexing circuit 53 of its own node, when the control packets are sent from the ringlet 910*a*. On the contrary, the circuit outputs the control packets to the multiplexing circuit 54 of its own node, when the control packets are sent from the ringlet 910*b*. When the control packets are sent from both of the ringlets 910*a* and 910*b* (e.g., at the transmission of broadcast control packets), the circuit outputs an RPR packet to each of the multiplexing circuits 53 and 54 of its own node.

The redundant node system control circuit 100 so controls the control packet processing circuits 63W and 63E as to avoid duplication of arrival of the control packet in another virtual redundant node. For example, when the circuit 100 controls the control packet processing circuit 63W to broadcast a control packet to each of the ringlets 910*a* and 910*b*, the circuit 100 controls another control packet processing circuit 63E not to output the control packet.

The multiplexing circuits 53 and 54 of each of the nodes 901 and 902 multiplex the input RPR packets, and send the packets to a corresponding ringlet. This operation is the same as the operation when set in a redundancy incompatible mode.

Upon reception of an RPR packet forwarded from a virtual redundant node other than its own virtual redundant node, each of the forwarding circuits 51 and 52 of each of the nodes 901 and 902 implements the same operation as that in the first embodiment. However, in the first embodiment, each of the forwarding circuits (specifically the forwarding circuits 51E and 52W) which receives the RPR packet from the other node of its own virtual redundant node is not to receive the RPR packet which has been generated by the other node of the virtual redundant node and multiplexed so as to be sent to the ringlet. In the second embodiment, however, each of the forwarding circuits is to receive such an RPR packet. Each of the forwarding circuits (forwarding circuits 51E and 52W) which receives an RPR packet from the other node of its own virtual redundant node implements the same operation as that in the first embodiment, and also implements the following process for RPR packets which have been generated by the other node of the virtual redundant node and multiplexed so as to be sent to the ringlet.

The forwarding circuit which is to receive the RPR packet from the other node of its own virtual redundant node prohibits "Source Strip" for the RPR packets which have been generated by the other node of the virtual redundant node and multiplexed so as to be sent to the ringlet. That is, the circuit sends the RPR packets which have been generated and sent by the other node of its own virtual redundant node, to the ringlet from which the packets have been forwarded, as they are.

Because the same RPR MAC address is given to the nodes 901 and 902, the RPR MAC SA of the RPR packet generated by the West Node 901 is the same as the RPR MAC address of the East Node 902. Generally, upon reception of the RPR packets having an RPR MAC SA which is the same as the RPR MAC address of its own node, each node discards (Source Strip) the RPR packets. However, in this embodiment, upon reception of RPR packets which have been generated by the other node 901 of its own virtual redundant node and multiplexed by the multiplexing circuit 53W so as to be sent to the ringlet 910*a*, the forwarding circuit 51E does not discard (Source Strip) the packets, but sends the RPR packets to the ringlet 910*a* from which the packets have been forwarded as they are. Similarly, in this embodiment, upon reception of RPR packets which are generated by the other node 902 of its own virtual redundant node and are multiplexed by the multiplexing path 54E so as be sent to the ringlet 910*b*, the forwarding circuit 52W does not discards (Source Strip) the packet but rather sends the RPR packets to the ringlet 910*a* from which the packet has been forwarded as they are.

In the first embodiment, each of the forwarding circuits (specifically the forwarding circuits 51E and 52W) is not to receive the broadcast packets which have been generated by the other node in its own virtual redundant node and multiplexed so as to be sent to the ringlet. Note each of the forwarding circuits receives the RPR packets from the other node of its own virtual redundant node. However, in the second embodiment, each of the forwarding circuits receives such broadcast packets. Each of the forwarding circuits (forwarding circuits 51E and 52W) which receives the RPR packets from the other node of its own virtual redundant node implements the same operation as that in the first embodiment, and implements the following process for broadcast packets (both of a broadcast data packet and a broadcast control packet) which are generated by the other node of the virtual redundant node and multiplexed so as to be sent to the ringlet.

Each of the forwarding circuits which receives the RPR packet from the other node of its own virtual redundant node implements only the transit process for the broadcast packets which have been generated by the other node of the virtual redundant node and multiplexed so as to be sent to the ringlet. That is, the circuit sends the broadcast packets which have been generated by the other node of its own virtual redundant node so as to be sent therefrom, to the ringlet from which the broadcast packets have been forwarded, as they are. Hence, upon reception of the broadcast packets which have been generated by the other node 901 of its own virtual redundant node and multiplexed by the multiplexing circuit 53W so as to be sent to the ringlet 910*a*, the forwarding circuit 51E sends the broadcast packets to the ringlet 910*a* as they are. Upon reception of the broadcast packets which have been generated by the other node 902 of its own virtual redundant node and multiplexed by the multiplexing circuit 54E so as to be sent to the ringlet 910*b*, the forwarding circuit 52W sends the broadcast packets to the ringlet 910*b* as they are.

Other operations of the node when set in the redundancy compatible mode are the same as those of the first embodiment.

Descriptions will now be made to operations of one node which is to output an RPR packet to the other node of the same virtual redundant node, when set in the redundancy incompatible mode. Now, the descriptions will be made to an example wherein the West Node 901 generates an RPR packet and sends it to the East Node 902. However, the same operations are implemented even in a case where the East Node 902 generates an RPR packet and sends it to the West Node 901.

The packet transformation circuit 61W of the West Node 901 receives a user data packet from the client device (not illustrated in FIG. 13), and searches for an RPR MAC address corresponding to a MAC DA of the user data packet. Assume that the search is achieved. The packet transformation circuit 61W generates RPR packets, whose RPR MAC DATA is the searched RPR MAC address and whose RPR MAC SA is an RPR MAC address common to the nodes 901 and 902. The packet transformation circuit 61W outputs the RPR packets to the ringlet selecting circuit 56W. The ringlet selecting circuit 56W selects a ringlet by referring to the RPR MAC DA. Assume that the ringlet 910a has been selected in this case. The ringlet selecting circuit 56W adds information of the selected ringlet to "ri" (Ringlet Identifier), and output the RPR packets to the TTL setting circuit 64W. The TTL setting circuit 64W sets a TTL value to the RPR packets. Since the ringlet 910a has been selected by the ringlet selecting circuit 56W, the TTL setting circuit 64W outputs the RPR packets to the multiplexing circuit 53W. The multiplexing circuit 53W multiplexes the RPR packets, and sends them to the ringlet 910a.

The forwarding circuit 51E of the East Node 902 receives the RPR packets. The RPR MAC SA of the RPR packets is the same as the RPR MAC address of the East Node. The forwarding circuit 51E sends the RPR packets to the ringlet 910a, as they are. As a result, the RPR packets generated by the West Node are forwarded to a next node without being discarded in the East Node 902.

Assume that the packet transformation circuit 61W fails to search for the RPR MAC address. In this case, the packet transformation circuit 61W generates broadcast packets, whose RPR MAC DA is the broadcast address and whose RPR MAC SA is an RPR MAC address common to the nodes 901 and 902. The packet transformation circuit 61W outputs the broadcast packet to the ringlet selecting circuit 56W. The ringlet selecting circuit 56W selects ringlets by referring to the RPR MAC DA. In this case, the circuit has selected both of the ringlets 910a and 910b. The ringlet selecting circuit 56W outputs broadcast packets having information of the ringlet 910a which is added to "ri", to the multiplexing circuit 53W, and outputs broadcast packets having information of the ringlet 910b which is added to "ri", to the multiplexing circuit 54W. The multiplexing circuit 53W multiplexes the broadcast packets output from the TTL setting circuit 64W, and sends them to the ringlet 910a. The multiplexing circuit 54W multiplexes the broadcast packets output from the TTL setting circuit 64W, and sends them to the ringlet 910b.

Upon reception of the broadcast packet sent from the multiplexing circuit 53W, the forwarding circuit 51E of the East Node 902 sends the broadcast packet to the ringlet 910a as is. As a result, the broadcast packet generated by the West Node passes through the East Node 902 so as to be forwarded to the next node.

The descriptions have been made to the case where the West Node 901 generates broadcast packet by encapsulating the user data packet, and sends it to the East Node 902. The same operation can be applied to the case where the control packet processing circuit 63W of the West Node 901 generates a broadcast control packet so as to send it to the East Node 902.

The explanations have been made to the case where the West Node 901 sends the RPR packets to the East Node 902. However, the same operation can be applied to the case where the East Node 902 sends an RPR to the West Node 901.

When the RPR packet forwarded from another virtual redundant node is received, the operations of each of the nodes 901 and 902 are the same as those in the first embodiment, thus will not be explained here.

Descriptions will now be made to the case where a link failure has occurred in a link between either one of the two nodes included in the virtual redundant node and the client device. The following descriptions will be made to the case where a link failure has occurred in the link between the West Node 901 and the client device. However, the same operations can be applied to the case where a link failure has occurred in the link between the East Node 902 and the client device.

The node (the West Node 901 in this example) with a failure in the link to the client continues to implement the same operation as the operation before detection of the link failure, even after the detection of the link failure.

The client device having detected the link failure implements the same operation as that in the first embodiment. That is, upon detection of a link failure in the link connected to one node, the client device sends a user data packet only to a node connected to the link without a failure (see Step S61 and Step S62 in FIG. 10).

The operation of the node without a failure in the link connected to the client device is the same as the operation of the first embodiment. That is, upon reception information representing a link failure between the other node and the client device, the operation of the filter circuit 62 of its own node is so changed that the filter circuit 62 of its own node permits the passage of the packet from any ringlets (see Step S71 and Step S72 of FIG. 11). Thus, in this embodiment, the operation of the filter circuit 62E is so changed that the filter circuit 62E permits the passage of the packet from any ringlets. Operations of each constituent component other than the filter circuit 62E are the same as the operations of the case where no link failure has occurred (in a normal state).

Upon occurrence of a link failure between the West Node 901 and the client device, the client device sends a user data packet only to the East Node 902. The East Node 902 implements the same operation for this user data packet as the operation in the normal state, and sends it to the ring. That is, the packet transformation circuit 61E encapsulates the packet so as to generate an RPR packet. Then, the ringlet selecting circuit 56E determines a ringlet to which the RPR packet is sent. The TTL setting circuit 64E sets a TTL, and outputs RPR packets to a multiplexing circuit corresponding to the determined ringlet. Each of the multiplexing circuits 53E and 54E multiplexes the RPR packets input from the TTL setting circuit 64E, and sends them to the ringlet. As described above, even if the other node 901 of the same virtual redundant node receives the RPR packets generated by this node 902, the node 901 permits the passage of the RPR packets from the node 902 as they are. Therefore, even if the client device sends user data packets only to the East Node 902, the virtual redundant node can send an RPR packet both of the ringlets 910a and 910b.

When a link failure has occurred in one node, the operation of the nodes 901 and 902 in the case where the nodes 901 and 902 receives RPR packets sent from another virtual redundant node are the same as the operations in the case where a link failure has occurred in the first embodiment. Thus, the packet sent by the West Node 901 to the client device when no link failure has occurred is sent to the client device by the East Node after the occurrence of the link failure. Even if a link failure has occurred in one node 901, the other node can send a user data packet to the client device.

In the second embodiment, when no link failure has occurred, the address tables 60W and 60E store the same learned contents. Thus, like the first embodiment, even if a failure has occurred in the link between one node and the client device, the failure can rapidly be recovered.

In the second embodiment, if the client device sends user data to one node without a link failure therebetween, the virtual redundant node can send an RPR node to any ringlets. By changing the operation of the filter circuit of the node without a link failure, a user data packet of the RPR packet forwarded from another virtual redundant node can be sent to the client device. Therefore, the failure can be recovered without having an effect on the operation of another node in the ring.

Like the first embodiment, in the second embodiment, for example, the superior provisioning setting technique is used for changing operations of the forwarding circuits 51 and 52, the multiplexing circuits 53 and 54 and the filter circuit 62. Even when the client device is connected to only one node, or even when the client device is connected to two nodes which are made redundant, the nodes can have a common configuration. This results in improving the efficiency in the node development and the efficiency in the inventory control.

In the second embodiment, a receiver is realized by the forwarding circuits 51 and 52. An address storage unit is realized by the address table 60. A sender for the client device is realized by the packet transformation circuit 61. A filter unit is realized by the filter circuit 62. A multiplexer is realized by 53 and 54. A packet generator is realized by the packet transformation circuit 61. A destination switch is realized by the TTL setting circuit 64. A first receiver is realized by the forwarding circuit 51. A second receiver is realized by the forwarding circuit 52. A first multiplexer is realized by the multiplexing circuit 53. A second multiplexer is realized by the multiplexing circuit 54.

In each of the above embodiments, as described above, the node includes each of the forwarding circuits 51 and 52, etc. However, the node may have a computer, and the computer may implement the same operations as those of the circuits shown in FIG. 13 and FIG. 12 (or FIG. 4 or FIG. 3) in accordance with a program. This program may be stored in a storage unit installed in advance in the node.

Figure 17:
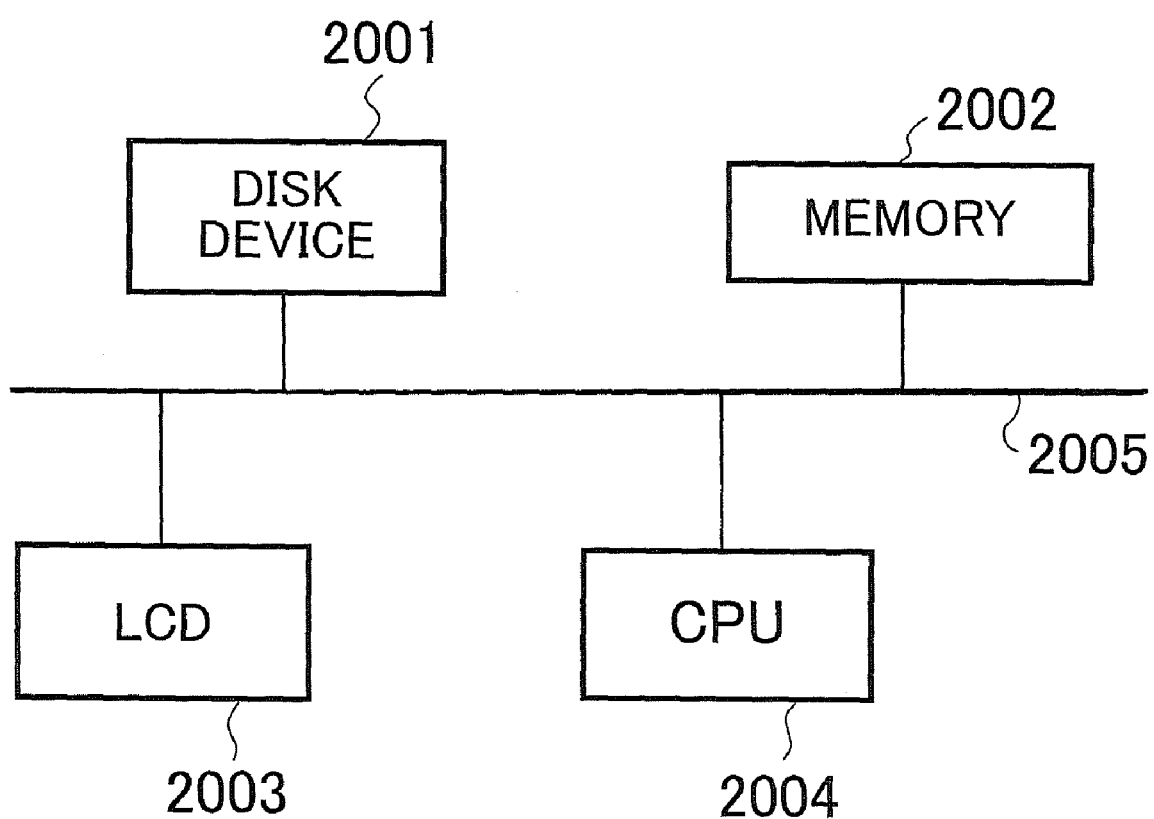
FIG. 17 is a block diagram showing one configuration example of a computer.

The program operating on the computer is stored in a disk device (storage unit), such as a hard disk or the like of the computer. Various functions of the node can be realized by executing this program. The program is stored on a magnetic disk, an optical disk, a semiconductor memory, and any other storage medium so as to be installed into a disk device (a hard disk, etc.) of the computer from the storage medium. FIG. 17 is a block diagram showing a configuration example of a computer. As shown in FIG. 17, the program is stored in a disk device 2001 (such as a hard disk, etc.), and information (for example, information of the address table 60) necessary for calculation processes of a CPU is stored in a memory 2002 (DRAM, etc.). Then, the CPU 2004 executes the program so as to realize the functions of the node. A display device (identified as LCD in the illustration) 2003 including a CRT (Cathode-Ray Tube) or an LCD (Liquid Crystal Display) is to display the states of information processing. A reference numeral 2005 identifies a bus, such as a data bus, etc.

The present invention can be practiced in other various forms without departing from the spirit and substantial features thereof. Thus, the above-described embodiments are illustrative only, and should not be viewed as a limitation of the invention. The scope of the present invention being indicated by the appended claims rather than by the foregoing description and all changes or modifications which come within the range of equivalency of the claims are therefore intended to be embraced therein.

The invention claimed is:

1. A packet ring network system comprising:
 a plurality of nodes;
 two ringlets both of which respectively connect the nodes circularly, one of which forwards packets therein in one direction and another of which forwards packets therein in a direction that is opposite to the one direction;
 a virtual redundant node which includes a combination of two nodes having a same address; and
 a client device which is connected to the two nodes of the virtual redundant node, respectively through links,
 wherein the client device distributes packets to transmit to the two nodes.

2. The packet ring network system according to claim 1, wherein
 each of the node included in the virtual redundant node comprises:
 two receivers respectively corresponding to the two ringlets and each of which receives a packet from a corresponding ringlet;
 an address storage unit which stores a corresponding relationship between an address of the client device and an address of the node connected to the client device;
 a sender for client device, which sends a packet to the client device; and
 a filter unit which permits or prohibits output of the packet received by the each of the receivers to the sender for client device.

3. The packet ring network system according to claim 2, wherein:
 of the receivers which receive a packet from a ringlet, in the two nodes included in the virtual redundant node,
 a receiver which first receives the packet
 sends a broadcast control packet to a next node without subtraction of TTL value and generates the same packet as the received broadcast control packet, upon reception of the broadcast control packet whose the TTL value is not zero, and
 sends a unicast control packet to a next node, and generates the same packet as the received unicast control packet, upon reception of the unicast control packet whose destination is an address of its own node; and
 a receiver which afterward receives the packet
 sends a broadcast control packet to a next node after subtracting one from TTL value, and generates the same packet as the received broadcast control packet, upon reception of the broadcast control packet whose the TTL value is not zero, and
 takes a unicast control packet from the ringlet, upon reception of the unicast control packet whose destination is an address of its own node.

4. The packet ring network system according to claim 2, wherein:
 of the receivers which receive a packet from a ringlet, in the two nodes included in the virtual redundant node,
 a receiver which first receives a packet
 sends a broadcast data packet to a next node without subtraction of TTL value, and generates the same packet as the received broadcast data packet, upon reception of the broadcast data packet whose the TTL value is not zero, and sends a unicast data packet to a next node, and generates the same packet as the received unicast data packet, upon reception of the unicast data packet whose destination is an address of its own node; and a receiver which afterward receives a packet sends a broadcast data packet to a next node after subtracting one from TTL value, and generates the same packet as the received broadcast data packet, upon reception of the broadcast data packet whose the TTL value is not zero, and takes a unicast data packet from the ringlet, upon reception of the unicast data packet whose destination is an address of its own node.

5. The packet ring network system according to claim 4, wherein the storage unit included in each node of the virtual redundant node learns and stores the corresponding relationship between an address of the client device and an address of the node connected to the each client device, based on the packet generated as the same packet as the broadcast data packet or unicast data packet received by the receiver of the same node, or based on the unicast data packet taken from the ringlet.

6. The packet ring network system according to claim 2, wherein:

the filter unit in one node which first receives a packet from one ringlet, of the two nodes included in the virtual redundant node permits output of a packet forwarded from the one ringlet to the sender for client device, and prohibits output of a packet forwarded from other ringlet to the sender for client device; and the filter unit in other node which first receives a packet from other ringlet, of the two nodes included in the virtual redundant node permits output of a packet forwarded from the other ringlet to the sender for client device, and prohibits output of a packet forwarded from the one ringlet to the sender for client device.

7. The packet ring network system according to claim 6, wherein:

when a failure has occurred in one of the links connected to the respective two nodes included in the virtual redundant node, the client device sends a packet to the node connected thereto through the link without occurrence of the failure; and the filter unit of each node included in the virtual redundant node permits output of a packet forwarded from any ringlets to the sender for client device, when a failure has occurred in a link between the client device and other node of the virtual redundant node.

8. The packet ring network system according to claim 1, wherein:

of the two nodes included in the virtual redundant node, one node which first receives a packet from one ringlet includes a multiplexer which multiplexes packets so as to send them to other ringlet, and a packet generator which generates a packet to be forwarded to a ringlet based on a packet received from the client device;

of the two nodes included in the virtual redundant node, one node which first receives a packet from the other ringlet includes a multiplexer which multiplexes packets so as to send them to the one ringlet, and a packet generator which generates a packet to be forwarded to a ringlet based on a packet received from the client device;

of the two nodes included in the virtual redundant node, one node which first receives a packet from the one ringlet includes a destination switch which outputs a packet to the multiplexer of the other node, when the packet generated based on the packet received from the client device is a packet to be sent to the one ringlet, and outputs a packet to the multiplexer of its own node, when the packet generated based on the packet received from the client device is a packet to be sent to the other ringlet;

of the two nodes included in the virtual redundant node, one node which first receives a packet from the other ringlet includes a destination switch which outputs a packet to the multiplexer of the other node, when the packet generated based on the packet received from the client device is a packet to be sent to the other ringlet, and which outputs a packet to the multiplexer of its own node, when the packet generated based on the packet received from the client device is a packet to be output to the one ringlet.

9. The packet ring network system according to claim 1, wherein each of the nodes included in the virtual redundant node includes:

a first multiplexer which multiplexes and sends packets to one ringlet;

a second multiplexer which multiplexes and sends packets to other ringlet; a packet generator which generates a packet to be forwarded to a ringlet based on a packet received from the client device; and a destination switch which outputs a packet to the first multiplexer of its own node, when the packet generated based on a packet received from the client device is a packet to be sent to the one ringlet, and which outputs a packet to the second multiplexer of its own node, when the packet generated based on a packet received from the client device is a packet to be sent to the other ringlet.

10. The packet ring network system according to claim 9, wherein each of the nodes included in the virtual redundant node includes a packet forwarding device which sends a packet to a next node as is, upon reception of the packet whose source address is an address of its own node from the other node of the virtual redundant node.

11. The packet ring network system according to claim 10, wherein the packet forwarding device of each of the nodes included in the virtual redundant node sends a broadcast packet to a next node as is, upon reception of the broadcast packet generated by other node from the other node included in the virtual redundant node.

12. A packet forwarding method comprising:

connecting a plurality of nodes circularly within a packet ring network system by each of two ringlets, one of the two ringlets forwarding packets in one direction and another of the two ringlets forwarding packets in a direction that is opposite to the one direction;

combining two nodes of the plurality of nodes within a virtual redundant node, the two nodes having a same address;

connecting a client device to the two nodes of the virtual redundant node, respectively through links; and, distributing packets for transmission, by the client device to the two nodes.

13. The packet forwarding method according to claim 12, comprising:

of the two nodes included in the virtual redundant node and receiving a packet from a ringlet, in a node which first receives a packet, sending a broadcast control packet to a next node without subtraction of TTL value and generating the same packet as the received broadcast control packet, upon reception of the broadcast control packet whose the TTL value is not zero;

sending a unicast control packet to a next node, and generating the same packet as the received unicast control packet, upon reception of the unicast control packet whose destination is an address of its own node; and in a node which afterward receives a packet, sending a broadcast control packet to a next node after subtracting one from TTL value, and generating the same packet as the received broadcast control packet, upon reception of the broadcast control packet whose the TTL value is not zero, and taking a unicast control packet from the ringlet, upon reception of the unicast control packet whose destination is an address of its own node.

14. The packet forwarding method according to claim 12, comprising:

of the two nodes included in the virtual redundant node and receiving a packet from a ringlet, in a node which first receives a packet, sending a broadcast data packet to a next node without subtraction of TTL value and generating the same packet as the received broadcast data packet, upon reception of the broadcast data packet whose the TTL value is not zero, sending a unicast data packet to a next node, and generating the same packet as the received unicast data packet, upon reception of the unicast data packet whose destination is an address of its own node; and in a node which afterward receives a packet, sending a broadcast data packet to a next node after subtracting one from TTL value, and generating the same packet as the received broadcast data packet, upon reception of the broadcast data packet whose the TTL value is not zero, and taking a unicast data packet from a ringlet, upon reception of the unicast data packet whose destination is an address of its own node.

15. The packet forwarding method according to claim 14, comprising:

in each of the nodes included in the virtual redundant node, learning and storing the corresponding relationship between an address of the client device and an address of the node connected to the client device, based on the packet generated as the same packet as the received broadcast data packet or unicast data packet, or based on the unicast data packet taken from the ringlet.

16. The packet forwarding method according to claim 12, comprising:

in the node included in the two nodes of the virtual redundant mode and first receiving a packet from the one ringlet, permitting output of a packet forwarded from the one ringlet to a sender for client device, which sends a packet to the client device, and prohibiting output of a packet forwarded from the other ringlet to the sender for client device; and in the node included in the two nodes of the virtual redundant mode and first receiving a packet from the other ringlet, permitting output of a packet forwarded from the other ringlet to the sender for client device, and prohibiting output of a packet forwarded from the one ringlet to the sender for client device.

17. The packet forwarding method according to claim 16, comprising:

when a failure has occurred in one of links for connecting between the two nodes included in the virtual redundant node and the client device, sending a packet to the node connected to the link without occurrence of the failure, in the client device; and permitting output of a packet forwarded from any ringlets to the sender for client device, in the node without occurrence of the failure in the link to the client device.

18. The packet forwarding method according to claim 12, comprising:

in the node of the two nodes included in the virtual redundant node and first receiving a packet from the one ringlet, generating a packet to be forwarded to a ringlet based on a packet received from the client device;

outputting the packet to the other node, and sending the packet to the other node, when the generated packet is a packet to be sent to the one ringlet; and sending the packet from its own node, when the generated packet is a packet to be sent to the other ringlet; and in the node of the two nodes included in the virtual redundant node and first receiving a packet from the other ringlet, generating a packet to be forwarded to a ringlet based on a packet received from the client device;

outputting the packet to the other node, and sending the packet to the other node, when the generated packet is one to be sent to the other ringlet; and sending the packet from its own node, when the generated packet is one to be sent to the one ringlet.

19. The packet forwarding method according to claim 12, further comprising:

in each of the nodes included in the virtual redundant node, generating a packet to be forwarded to a ringlet based on a packet received from the client device; and sending the generated packet from its own node, regardless of whether the generated packet is a packet to be sent to the one ringlet or to be sent to the other ringlet.

20. The packet forwarding method according to claim 19, further comprising:

in each of the nodes included in the virtual redundant node, sending a packet to a next node as is, upon reception of the packet whose source address is an address of its own node from the other node included in the virtual redundant node.

21. The packet forwarding method according to claim 19, further comprising:

in each of the nodes included in the virtual redundant node, sending a broadcast packet to a next node as is, upon reception of the broadcast packet generated by other node from the other node included in the virtual redundant node.

22. A node which is applied to a packet ring network system including a plurality of nodes connected to each other through two ringlets for forwarding packets in opposite directions to each other, and the node being used in a first usage state wherein the node is independently arranged by itself, in a second usage state wherein the node is combined with other node having the same address as an address of its own node and is so arranged as to receive a packet from one ringlet before the other node, or in a third usage state wherein the node is combined with other node having the same address as an address of its own node and is so arranged as to receive a packet from one ringlet after the other node, the node comprising:

a first receiver which receives a packet from one ringlet;
a second receiver which receives a packet from other ringlet;
a sender for client device, which sends a packet to a client device; and
a filter unit which permits or prohibits output of the packet received by the first receiver or the second receiver to the sender for client device, wherein:
the first receiver
implements a process corresponding to the received packet in accordance with a predetermined rule, in the first usage state,
upon reception of the broadcast packet whose TTL value is not zero, sends the broadcast packet to a next node without subtraction of its TTL value and generates the same packet as the received broadcast packet, and upon reception of the unicast packet whose destination is an address of its own node, sends the unicast packet to a next node, and generates the same packet as the received unicast packet, in the second usage state, and
upon reception of the broadcast packet whose TTL value is not zero, sends the broadcast packet to a next node after subtracting one from its TTL value and generates the same packet as the received broadcast packet, and, upon reception of the unicast data packet whose destination is an address of its own node, takes the unicast data packet from a ringlet, in the third usage state;
the second receiver
implements a process corresponding to the received packet in accordance with a predetermined rule, in the first usage state,
upon reception of the broadcast packet whose TTL value is not zero, sends the broadcast packet to a next node after subtracting one from its TTL value and generates the same packet as the received broadcast packet, and, upon reception of the unicast data packet whose destination is an address of its own node, takes the unicast data packet from a ringlet, in the second usage state, and
upon reception of the broadcast packet whose TTL value is not zero, sends the broadcast packet to a next node without subtraction of TTL value and generates the same packet as the received broadcast packet, and, upon reception of the unicast packet whose destination is an address of its own node, sends the unicast packet to a next node and generates the same packet as the received unicast packet, in the third usage state; and
the filter unit
permits output of the packet received by both of the first receiver and the second receiver to the sender for client device, in the first usage state,
permits output of the packet received by the first receiver to the sender for client device, and prohibits output of the packet received by the second receiver to the sender for client device, in the second usage state,
prohibits output of the packet received by the first receiver to the sender for client device, and permits output of the packet received by the second receiver to the sender for client device, in the third usage state.

23. The node according to claim 22, further comprising:
a packet generator which generates packets to be forwarded to a ringlet based on a packet received from the client device;
a first multiplexer which multiplexes at least the packets generated by the packet generator so as to send them to one ringlet;
a second multiplexer which multiplexes at least the packets generated by the packet generator so as to send them to other ringlet; and
a destination switch which outputs the packet generated by the packet generator to the first multiplexer or second multiplexer of its own node or the other node, wherein the destination switch
outputs the packet generated by the packet generator to the first multiplexer or second multiplexer of its own node, in accordance with a target ringlet to which the packet is sent, in the first usage state,
outputs the packet generated by the packet generator to the first multiplexer included in the other node when the packet is a packet to be sent to the one ringlet, and outputs the packet generated by the packet generator to the second multiplexer included in its own node when the packet is a packet to be sent to the other ringlet, in the second usage state,
outputs the packet generated by the packet generator to the first multiplexer included in its own node when the packet is a packet to be sent to the one ringlet, and outputs the packet generated by the packet generator to the second multiplexer included in the other node when the packet is a packet to be sent to the other ringlet, in the third usage state.

24. The node according to claim 22, further comprising:
a packet generator which generates packets to be forwarded to a ringlet based on a packet received from the client device;
a first multiplexer which multiplexes at least the packets generated by the packet generator so as to send them to one ringlet;
a second multiplexer which multiplexes at least the packets generated by the packet generator so as to send them to other ringlet; and
a destination switch which outputs the packets generated by the packet generator to the first multiplexer or second multiplexer in its own node corresponding to a target ringlet to which the packet is sent, and wherein
the first receiver sends, upon reception of a packet whose source address is an address of its own node from the other node, the packet to a next node as is, in the third usage state, and
the second receiver sends, upon reception of the packet whose source address is an address of its own node from the other node, the packet to a next node as is, in the second usage state.

25. A Non-transitory computer readable medium having a program for node for executing a computer included in a node which is applied to a packet ring network system having a plurality of nodes connected through two ringlets for forwarding packets in opposite directions to each other, the node being used in a first usage state wherein the node is independently arranged by itself, a second usage state wherein the node is combined with other node having the same address as an address of its own node and is so arranged as to receive a packet from one ringlet before the other node, or a third usage state wherein the node is combined with other node having the same address as an address of its own node and is so arranged as to receive a packet from one ringlet after the other node, and the program making the computer executing:

a first receiving process of:
        receiving a packet from one ringlet,
            executing a process corresponding to the received packet in accordance with a predetermined rule in the first usage state,
        sending a broadcast packet to a next node without subtraction of TTL value and generating the same packet as the received broadcast packet, upon reception of the broadcast packet whose the TTL value is not zero, and sending a unicast packet to a next node and generating the same packet as the received unicast packet, upon reception of the unicast packet whose destination is an address of its own node, in the second usage state, and
        subtracting one from TTL value of a broadcast packet, sending the broadcast packet to a next node and generating the same packet as the received broadcast packet, upon reception of the broadcast packet whose the TTL value is not zero, and taking a unicast data packet from a ringlet, upon reception of the unicast data packet whose destination is an address of its own node, in the third usage state;
    a second receiving process of:
        receiving a packet from the other ringlet,
        executing a process corresponding to the received packet in accordance with a predetermined rule in the first usage state,
        sending a broadcast packet to a next node after subtracting one from TTL value and generating the same packet as the received broadcast packet, upon reception of the broadcast packet whose the TTL value is not zero, and taking a unicast data packet from a ringlet, upon reception of the unicast data packet whose destination is an address of its own node, in the second usage state, and
        sending a broadcast packet to a next node without subtraction of TTL value and generating the same packet as the received broadcast packet, upon reception of the broadcast packet whose the TTL value is not zero, and sending a unicast packet to a next node and generating the same packet as the received unicast packet, upon reception of the unicast packet whose destination is an address of its own node, in the third usage state;
    a filtering process of:
        passing the packet received by both in the first receiving process and second receiving process in the first usage state,
        discarding the packet received by the second receiver without discarding the packet received in the first receiving process in the second usage state,
        discarding the packet received in the first receiving process without discarding the packet received in the second receiving process in the third usage state; and
    a sending process for client device of sending the packet which has been passed in the filtering process to a client device.

\* \* \* \* \*